United States Patent
Ikeda et al.

(10) Patent No.: US 7,267,492 B2
(45) Date of Patent: Sep. 11, 2007

(54) OPTICAL INTEGRATED DEVICE

(75) Inventors: Seiichi Ikeda, Kawasaki (JP); Seimi Sasaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/099,607

(22) Filed: Apr. 6, 2005

(65) Prior Publication Data
US 2006/0104575 A1    May 18, 2006

(30) Foreign Application Priority Data
Oct. 21, 2004    (JP)    ............................. 2004-307177

(51) Int. Cl.
*G02B 6/36* (2006.01)
(52) U.S. Cl. .............................. 385/88; 385/92; 385/94
(58) Field of Classification Search ...................... None
See application file for complete search history.

(56) References Cited

U.S. PATENT DOCUMENTS

| | | | | |
|---|---|---|---|---|
| 4,997,243 | A * | 3/1991 | Aiki et al. ...................... | 385/92 |
| 6,067,393 | A * | 5/2000 | Kitaoka et al. ................ | 385/49 |
| 6,190,056 | B1 * | 2/2001 | Kwon et al. ................... | 385/91 |
| 6,266,470 | B1 * | 7/2001 | Kang et al. ................... | 385/137 |
| 6,435,736 | B1 * | 8/2002 | Irie et al. ...................... | 385/92 |
| 6,720,582 | B2 * | 4/2004 | Miyokawa et al. ............ | 257/98 |
| 6,769,819 | B2 * | 8/2004 | Tanaka et al. ................. | 385/92 |
| 2001/0026664 | A1* | 10/2001 | Tanaka et al. ................. | 385/92 |
| 2002/0126965 | A1* | 9/2002 | Miyokawa .................... | 385/92 |

OTHER PUBLICATIONS

Patent Abstracts of Japan, Publication No. 07-063957, Published Mar. 10, 1995.
Patent Abstracts of Japan, Publication No. 09-080269, Published Mar. 28, 1997.
Patent Abstracts of Japan, Publication No. 11-287930, Published Oct. 19, 1999.
Patent Abstracts of Japan, Publication No. 60-076128, Published Apr. 30, 1985.
Patent Abstracts of Japan, Publication No. 2000-277843, Published Oct. 6, 2000.
Patent Abstracts of Japan, Publication No. 2001-337250, Published Dec. 7, 2001.
Patent Abstracts of Japan, Publication No. 2003-295142, Published Oct. 15, 2003.

* cited by examiner

*Primary Examiner*—Sung Pak
(74) *Attorney, Agent, or Firm*—Staas & Halsey LLP

(57) ABSTRACT

An optical integrated device in which application of an excessive stress or the appearance of a crack due to thermal expansion mismatching is prevented. A first ferrule is fixed to an optical waveguide chip. An optical fiber is inserted into the first ferrule to fix the optical fiber. A package contains the optical waveguide chip and the first ferrule. An opening is made in a sidewall of the package to pull out the optical fiber to the outside. A pipe is airtightly fixed around the opening. A second ferrule is inserted into the pipe and is airtightly fixed to an end of the pipe. The optical fiber pulled out to the outside of the package through the opening is inserted into the second ferrule to fix the optical fiber. The optical fiber without deflection is contained in the package by making a first expansion/contraction amount created due to the thermal expansion of the package and the thermal expansion of the pipe match a second expansion/contraction amount created due to the thermal expansion of the optical fiber and the thermal expansion of the second ferrule.

22 Claims, 32 Drawing Sheets

| SECTION | MATERIAL | THERMAL EXPANSION COEFFICIENT (/° C) | DISTANCE IN DIRECTION OF OPTICAL AXIS (mm) |
|---|---|---|---|
| A–B | LN | $\alpha 1 = 16.7 \times 10^{-6}$ | $Z1 = 25$ |
| A–C | Alloy50 | $\alpha 2 = 9.2 \times 10^{-6}$ | $Z2 = 0$ |
| C–D | CuW(20) | $\alpha 3 = 8.1 \times 10^{-6}$ | $Z3 = 31.7$ |
| D–E | SUS304 | $\alpha 4 = 17.3 \times 10^{-6}$ | $Z4 = 1.3$ |
| E–F | SUS304 | $\alpha 4 = 17.3 \times 10^{-6}$ | $Z5 = 5$ |
| F–G | SUS304 | $\alpha 5 = 17.3 \times 10^{-6}$ | $Z6 = 3$ |

FIG. 13

| SECTION | MATERIAL | THERMAL EXPANSION COEFFICIENT (/° C) | DISTANCE IN DIRECTION OF OPTICAL AXIS (mm) |
|---|---|---|---|
| A1–B1 | SUS304 | $\alpha 1 = 17.3 \times 10^{-6}$ | S10 = 5 |
| A1–C1 | SUS304 | $\alpha 1 = 17.3 \times 10^{-6}$ | Z11 = 31.8 |
| C1–D1 | Kovar | $\alpha 2 = 5.3 \times 10^{-6}$ | Z12 = −1.8 |
| D1–E1 | CuW(20) | $\alpha 3 = 8.1 \times 10^{-6}$ | Z13 = 35 |
| E1–F1 | SUS304 | $\alpha 4 = 17.3 \times 10^{-6}$ | Z14 = 2.5 |

FIG. 16

| SECTION | MATERIAL | THERMAL EXPANSION COEFFICIENT (/° C) | DISTANCE IN DIRECTION OF OPTICAL AXIS (mm) |
|---|---|---|---|
| B2-C2 | InP | $\alpha 1 = 4.5 \times 10^{-6}$ | $Z20 = 5$ |
| A2-C2 | Alloy42 | $\alpha 2 = 3.1 \times 10^{-6}$ | $Z21 = 6.25$ |
| A2-D2 | Alloy42 | $\alpha 2 = 3.1 \times 10^{-6}$ | $Z23 = 6.25$ |
| D2-E2 | CuW(15) | $\alpha 3 = 6.5 \times 10^{-6}$ | $Z24 = 10.25$ |
| E2-F2 | Alloy42 | $\alpha 5 = 3.1 \times 10^{-6}$ | $Z25 = 1$ |

FIG. 19

| SECTION | MATERIAL | THERMAL EXPANSION COEFFICIENT (/° C) | DISTANCE IN DIRECTION OF OPTICAL AXIS (mm) |
|---|---|---|---|
| A-B | LN | $\alpha 1 = 16.7 \times 10^{-6}$ | $Z1 = 25$ |
| A-C | Kovar | $\alpha 2 = 5.3 \times 10^{-6}$ | $Z2 = 0$ |
| C-D | CuW(20) | $\alpha 3 = 8.1 \times 10^{-6}$ | $Z3 = 31.7$ |
| D-E | SUS304 | $\alpha 4 = 17.3 \times 10^{-6}$ | $Z4 = 1.3$ |
| E-F | SUS304 | $\alpha 4 = 17.3 \times 10^{-6}$ | $Z5 = 5$ |
| F-G | SUS304 | $\alpha 5 = 17.3 \times 10^{-6}$ | $Z6 = 3$ |

FIG. 22

| SECTION | MATERIAL | THERMAL EXPANSION COEFFICIENT (/° C) | DISTANCE IN DIRECTION OF OPTICAL AXIS (mm) |
|---|---|---|---|
| A3-B3 | Kovar | $\alpha a = 5.3 \times 10^{-6}$ | S30=1.25 |
| A3-C3 | Kovar | $\alpha a = 5.3 \times 10^{-6}$ | Z41=5 |
| C3-D3 | Kovar | $\alpha 2 = 5.3 \times 10^{-6}$ | Z42=1.25 |
| E3-F3 | LN | $\alpha b = 16.7 \times 10^{-6}$ | Z44=19.5 |
| F3-G3 | Kovar | $\alpha 2 = 5.3 \times 10^{-6}$ | Z45=0 |
| D3-G3 | CuW(20) | $\alpha 3 = 8.1 \times 10^{-6}$ | Z43=30.75 |

FIG. 24

| SECTION | MATERIAL | THERMAL EXPANSION COEFFICIENT (/° C) | DISTANCE IN DIRECTION OF OPTICAL AXIS (mm) |
|---|---|---|---|
| A–B | LN | α1=16.7×10^−6 | Z1=25 |
| A–C | Kovar | α2=5.3×10^−6 | Z2=0 |
| C–D | CuW(20) | α3=8.1×10^−6 | Z3=31.7 |
| D–E | SUS304 | α4=17.3×10^−6 | Z4=1.3 |
| E–F | SUS304 | α4=17.3×10^−6 | Z5=5 |
| F–G | SUS304 | α5=17.3×10^−6 | Z6=3 |

FIG. 27

| SECTION | MATERIAL | THERMAL EXPANSION COEFFICIENT (/° C) | DISTANCE IN DIRECTION OF OPTICAL AXIS (mm) |
|---|---|---|---|
| B4–C4 | InP | $\alpha a = 4.5 \times 10^{-6}$ | $Z50 = 4$ |
| A4–C4 | Kovar | $\alpha 2 = 5.3 \times 10^{-6}$ | $Z51 = 5.25$ |
| C4–D4 | Kovar | $\alpha 2 = 5.3 \times 10^{-6}$ | $Z52 = 1$ |
| A4–D4 | Kovar | $\alpha 2 = 5.3 \times 10^{-6}$ | $Z53 = 6.25$ |
| E4–F4 | LN | $\alpha b = 16.7 \times 10^{-6}$ | $Z55 = 25$ |
| F4–G4 | Kovar | $\alpha 2 = 5.3 \times 10^{-6}$ | $Z56 = 0$ |
| D4–G4 | CuW(20) | $\alpha 3 = 8.1 \times 10^{-6}$ | $Z54 = 36.25$ |

FIG. 29

OPTICAL INTEGRATED DEVICE

CROSS-REFERENCE TO RELATED APPLICATIONS

This application is based upon and claims the benefits of priority from the prior Japanese Patent Application No. 2004-307177, filed on Oct. 21, 2004, the entire contents of which are incorporated herein by reference.

BACKGROUND OF THE INVENTION (1) Field of the Invention

This invention relates to an optical integrated device and, more particularly, to an optical integrated device in which optical parts are contained in the same package.

(2) Description of the Related Art

With the spread of the Internet and cellular telephones, there have been demands for large-capacity transmission lines. Communication networks have come to depend largely on optical fibers which enable high-speed large-capacity transmission, so it is of urgent necessity to provide optical communication networks using techniques, such as wavelength division multiplex (WDM).

FIG. 31 shows the rough structure of an optical transmitter used for WDM transmission. An optical transmitter 50 comprises a semiconductor laser 51, a thermoelectric cooler 52, an optical modulator 53, and a control section 54. An optical fiber 55 to which optical signals are outputted is connected to the optical modulator 53.

The semiconductor laser 51 is a light source from which light is emitted. The thermoelectric cooler 52 controls the temperature of the semiconductor laser 51 so that the optical output and oscillation wavelength of the semiconductor laser 51 will be constant.

The optical modulator 53 is an optical waveguide chip formed by using a substrate made from a material, such as lithium niobate ($LiNbO_3$, hereinafter referred to as LN), having an electro-optic effect. An electrode is located near an optical waveguide. The intensity of light continuously outputted from the semiconductor laser 51 is modulated by electrical signals applied to this electrode to generate optical pulse signals. These optical pulse signals are outputted from the optical fiber 55.

The control section 54 includes a drive circuit for the semiconductor laser 51, a control circuit for the thermoelectric cooler 52 and a drive circuit for the optical modulator 53. The control section 54 sends a drive signal to the semiconductor laser 51 to control it. The control section 54 sends a drive signal to the optical modulator 53 to control it. The control section 54 sends a temperature control signal generated according to a change in the temperature of the semiconductor laser 51 to the thermoelectric cooler 52 to control the temperature of the semiconductor laser 51.

In the conventional optical transmitter 50 having the above structure, usually individual parts including the semiconductor laser 51 and the optical modulator 53 are formed as different optical devices by using optical parts, such as a lens and an optical fiber, and these optical devices are connected by optical fibers and connectors or splices.

Meanwhile, the recent spread of optical communication networks greatly requires that the size and manufacturing costs of optical transmitters and optical receivers should be reduced further. Therefore, the method of connecting individual parts should not be adopted. It is important to locate main parts, such as a semiconductor laser and an optical modulator, in the same package and to make assembly easy.

Conventionally, the following method has been proposed as a technique for locating a semiconductor laser and an optical waveguide chip in the same package. A semiconductor laser and an optical waveguide chip are connected via a polarization maintaining fiber in a package to stabilize the emission of light from the semiconductor laser and to avoid characteristic variations due to a deviation in optical axis (see, for example, Japanese Unexamined Patent Publication No. 2003-295142 (paragraphs [0033]-[0039] and FIG. 4)).

To fabricate an integrated device in which optical parts are contained in one package, the optical parts are adhered to the package with an adhesive. Then the package is put into an oven to heat the package to which the optical parts are adhered. By doing so, the adhesive hardens. Accordingly, if there is a difference in thermal expansion between the package and the optical parts adhered to the package with the adhesive, then a stress may be created due to a difference in contraction, resulting in cracks in one or more optical parts.

Therefore, to fabricate devices in which an optical waveguide chip which is sensitive to an external stress is contained in a package as an optical part, the thermal expansion of the optical waveguide chip must match that of the package. With LN optical waveguide chips, for example, usually stainless steel (SUS, 18Cr-8Ni—Fe) is used as a package material.

In addition, an optical fiber is connected to the optical waveguide chip. Accordingly, in conventional devices, the optical fiber must have a deflection ($\leq 10$ μm) in the package with a difference in thermal expansion between the optical waveguide chip and the optical fiber (glass) taken into consideration.

FIG. 32 shows the structure of a conventional optical integrated device. An optical integrated device 60 comprises a package 61, an optical waveguide chip 62, a glass ferrule 63, a metal ferrule 64, and an optical fiber 65.

The optical waveguide chip 62 is adhered and fixed to the package 61. To fix the optical fiber 65, it is inserted into the glass ferrule 63 and the metal ferrule 64. The glass ferrule 63 is adhered and fixed to the optical waveguide chip 62 with an adhesive. The metal ferrule 64 penetrates through a sidewall of the package 61 and is adhered and fixed to the package 61. The metal ferrule 64 is fixed airtightly to the package 61 with solder or the like. The optical fiber 65 inserted into the glass ferrule 63 and the metal ferrule 64 is connected to the optical waveguide chip 62. (After necessary optical parts are located in the package, the package is finally capped and is heated.)

One end of the optical fiber 65 is fixed to the optical waveguide chip 62 and the other end of the optical fiber 65 is fixed to the package 61. As stated above, if they are heated in such a state, the optical fiber 65 is pulled or shrunk by a stress created due to a difference in thermal expansion between the package 61 and the optical fiber 65. Therefore, as can be seen from a figure which shows the optical integrated device 60 from the X direction, the optical fiber 65 in the package 61 has a deflection not greater than about 10 μm. As a result, even if the optical fiber 65 is pulled due to a difference in thermal expansion between the package 61 and the optical fiber 65, a stress will not be applied to the optical fiber 65.

However, a precision fixing technique is necessary for maintaining and fixing a deflection not greater than 10 μm. In addition, a large number of man-hours are taken to perform assembly, and variation occurs depending on fixing methods. Moreover, an excessive deflection leads to an excess insertion loss and a lack of deflection leads to a fracture of the optical fiber due to a difference in thermal expansion.

To fabricate devices in which a semiconductor laser and a thermoelectric cooler, together with an optical waveguide chip, are contained in a package as optical parts, the heat dissipativity of the thermoelectric cooler must be ensured. Accordingly, copper-tungsten (CuW) the heat dissipativity (thermal conductivity) of which is high is often used as a package material.

However, there is a great difference in thermal expansion between a package made from CuW and an optical waveguide chip made from LN (the thermal expansion coefficient of the package (CuW) is $8\times10^{-6}$ (/° C.) and the thermal expansion coefficient of the optical waveguide chip (LN) is $16.7\times10^{-6}$(/° C.)). Therefore, if the optical waveguide chip is fixed directly onto the package, an excessive stress is applied due to a difference in thermal expansion and a crack may appear in the optical waveguide chip.

If the optical waveguide chip is fixed onto the package with a soft adhesive, a stress created due to a difference in thermal expansion can be weakened. In this case, however, the soft adhesive must have a measure of thickness, so the optical waveguide chip cannot be fixed firmly onto the package. That is to say, the optical waveguide chip easily moves (vibrates) by vibrations or shocks. This causes a deviation in optical axis between the semiconductor laser and the optical waveguide chip and characteristic variations (insertion loss) are apt to occur.

On the other hand, with the above-mentioned prior art (Japanese Unexamined Patent Publication No. 2003-295142), the semiconductor laser and the optical waveguide chip are connected via the polarization maintaining fiber. If the length of the polarization maintaining fiber connected to the input end of the optical waveguide chip is, for example, about 10 mm, the size of the package is large compared to the case where light condensed by a lens is inputted directly to an optical waveguide.

To reduce the size of the package, it is possible to simply shorten the polarization maintaining fiber. However, if the polarization maintaining fiber is short, even a slight change in position due to, for example, thermal expansion will significantly increase bending R of the polarization maintaining fiber. As a result, the optical loss of the polarization maintaining fiber increases and the reliability of the polarization maintaining fiber deteriorates.

Accordingly, with the optical connection technique using a polarization maintaining fiber, it is difficult to realize miniaturizing a package and maintaining reliability at the same time. In addition, in the above-mentioned prior art, the optical waveguide chip is fixed directly onto the package. Therefore, as stated above, a crack may appear in the optical waveguide chip due to a difference in thermal expansion.

SUMMARY OF THE INVENTION

The present invention was made under the background circumstances described above. An object of the present invention is to provide a high-quality optical integrated device in which the application of an excessive stress or the appearance of a crack due to thermal expansion mismatching is prevented, which can easily be assembled, and the characteristics of which do not vary.

In order to achieve the above object, an optical integrated device in which optical parts are contained in the same package is provided. This optical integrated device comprises an optical waveguide chip for modulating optical signals; an optical fiber; a first ferrule which is fixed to the optical waveguide chip and into which the optical fiber is inserted for fixing the optical fiber; a package which contains the optical waveguide chip and the first ferrule and in a sidewall of which an opening is made for pulling out the optical fiber to the outside; a pipe airtightly fixed around the opening; and a second ferrule which is inserted into the pipe for airtightly fixing the second ferrule to an end of the pipe and into which the optical fiber pulled out to the outside of the package through the opening is inserted for fixing the optical fiber, wherein the optical fiber without deflection is contained in the package by making a first expansion/contraction amount created due to the thermal expansion of the package and the thermal expansion of the pipe match a second expansion/contraction amount created due to the thermal expansion of the optical fiber and the thermal expansion of the second ferrule.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 13 shows the concrete numerical values of parameters.

FIG. 16 shows the concrete numerical values of parameters.

FIG. 19 shows the concrete numerical values of parameters.

FIG. 22 shows the concrete numerical values of parameters.

FIG. 24 shows the concrete numerical values of parameters.

FIG. 27 shows the concrete numerical values of parameters.

FIG. 29 shows the concrete numerical values of parameters.

DESCRIPTION OF THE PREFERRED EMBODIMENTS

Figure 1:
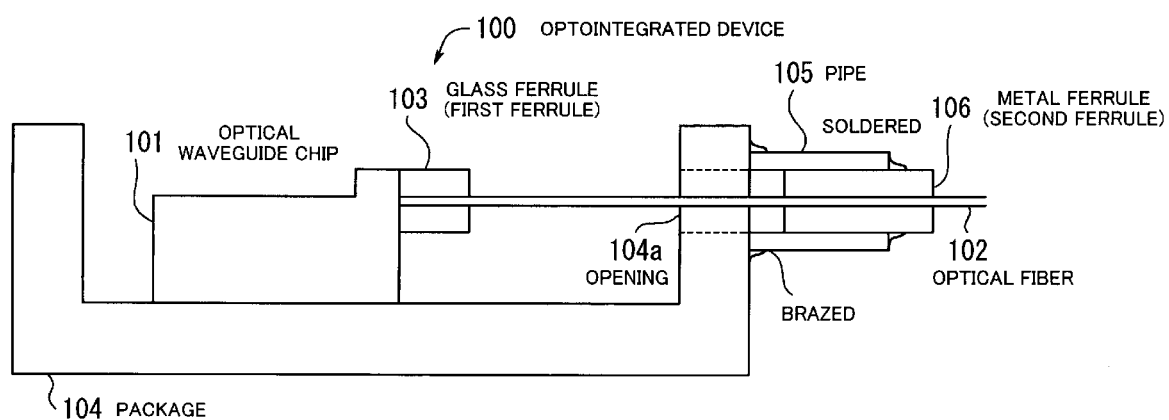
FIG. 1 shows the structure of an optical integrated device.

Embodiments of the present invention will now be described with reference to the drawings. FIG. 1 shows the structure of an optical integrated device. An optical integrated device 100 is an integrated device in which optical parts are contained in the same package, and comprises an optical waveguide chip 101, an optical fiber 102, a first ferrule (glass ferrule) 103, a package 104, a pipe 105, and a second ferrule (metal ferrule) 106.

The optical waveguide chip 101 is an optical modulator for modulating optical signals. The glass ferrule 103 is fixed to the optical waveguide chip 101. The optical fiber 102 is inserted into the glass ferrule 103 to fix the optical fiber 102. The package 104 contains the optical waveguide chip 101 and the glass ferrule 103. An opening 104a is made in a sidewall of the package 104 to pull out the optical fiber 102 to the outside.

The pipe 105 is fixed airtightly (by brazing or the like) around the opening 104a. The metal ferrule 106 is inserted into the pipe 105 and is fixed airtightly (by soldering or the like) to an end of the pipe 105. The optical fiber 102 pulled out to the outside of the package 104 through the opening 104a is inserted into the metal ferrule 106 to fix the optical fiber 102.

Figure 2:
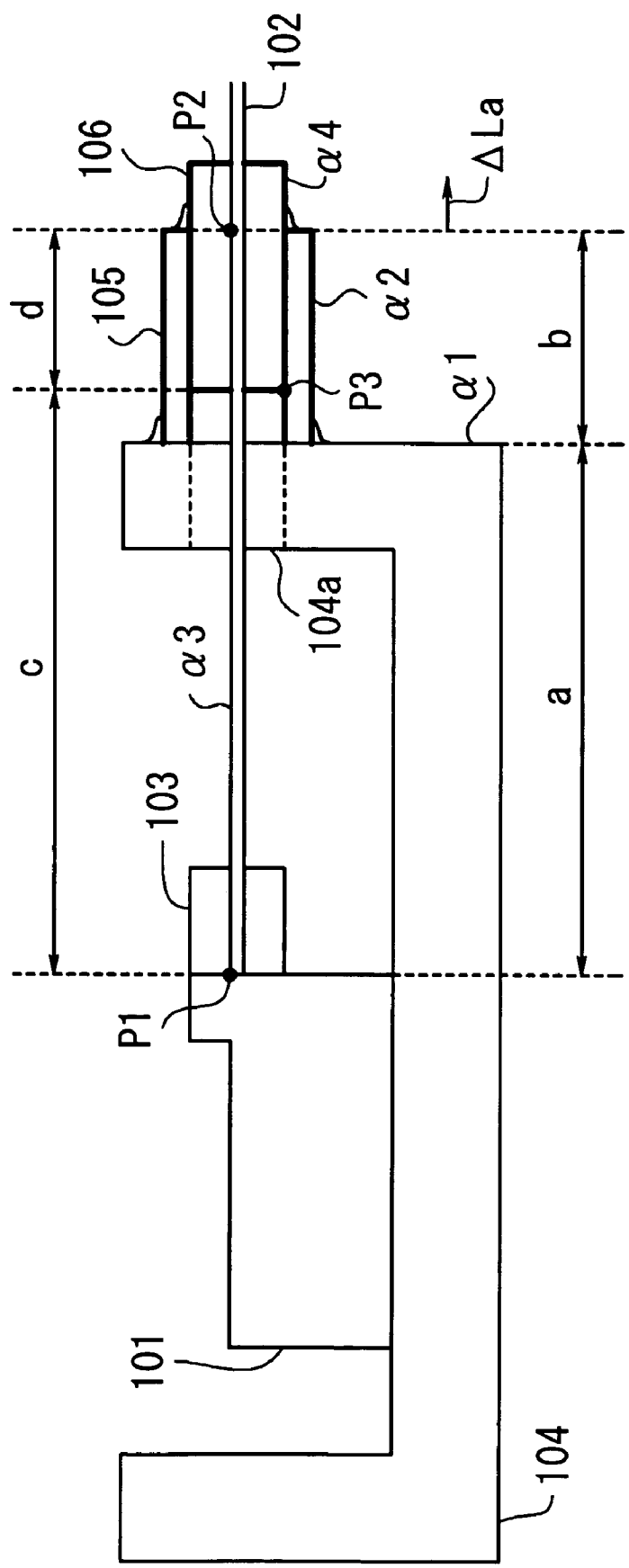
FIG. 2 is a view for describing correction of a difference in thermal expansion in the optical integrated device.

FIG. 2 is a view for describing correction of a difference in thermal expansion in the optical integrated device 100. a expresses the distance between a point (P1) where the optical fiber 102 is fixed to the optical waveguide chip 101 and the outer surface of the sidewall of the package 104. b expresses the distance between the outer surface of the sidewall of the package 104 and a point (P2) where the metal ferrule 106 is fixed to the pipe 105. c expresses the distance between the point P1 and a point (P3) where the optical fiber 102 and the metal ferrule 106 connect. d expresses the distance between the points P3 and P2.

$\alpha 1$ expresses the thermal expansion coefficient of the package 104. $\alpha 2$ expresses the thermal expansion coefficient of the pipe 105. $\alpha 3$ expresses the thermal expansion coefficient of the optical fiber 102. $\alpha 4$ expresses the thermal expansion coefficient of the metal ferrule 106. $\Delta T$ expresses a temperature difference at the time of fabricating the device.

If a material A is heated, the amount of the expansion/contraction of the material A can be expressed as $$\alpha \times L \times \Delta T$$

where L is the length of the material A, $\alpha$ is the thermal expansion coefficient of the material A, and $\Delta T$ is a temperature difference.

Therefore, a first expansion/contraction amount $\Delta L1$ (amount of the expansion/contraction of the package proper) created due to the thermal expansion of the package 104 and the thermal expansion of the pipe 105 can be calculated by $$\Delta L1 = \alpha 1 \times a \times \Delta T + \alpha 2 \times b \times \Delta T \qquad (1)$$

That is to say, the expansion/contraction amount $\Delta L1$ of the package proper (i.e., the package 104 and the pipe 105 fixed thereto) in a heating process performed at the time of fabricating the device is the sum of the expansion/contraction amount ($\alpha 1 \times a \times \Delta T$) which depends on the package 104 and the expansion/contraction amount ($\alpha 2 \times b \times \Delta T$) which depends on the pipe 105.

A second expansion/contraction amount $\Delta L2$ (amount of the expansion/contraction of the optical fiber) created due to the thermal expansion of the optical fiber 102 and the thermal expansion of the metal ferrule 106 can be calculated by $$\Delta L2 = \alpha 3 \times c \times \Delta T + \alpha 4 \times d \times \Delta T \qquad (2)$$

That is to say, the expansion/contraction amount $\Delta L2$ of the optical fiber 102 is the sum of ($\alpha 3 \times c \times \Delta T$) which is the amount of the expansion/contraction of the optical fiber 102 itself and ($\alpha 4 \times d \times \Delta T$) which is the amount of the expansion/contraction of the metal ferrule 106.

Therefore, if $\Delta L1$ calculated by equation (1) equals $\Delta L2$ calculated by equation (2), then an excessive stress is not applied to the optical fiber 102. As shown in FIG. 2, for example, if the package proper expands by $\Delta La$ at heating time, then the optical fiber 102 will also expand by $\Delta La$. As a result, a stress is not applied to the optical fiber 102.

Descriptions will now be given by using concrete examples of a component material and a parameter value. The package 104 is made from SUS and the pipe 105 is made from Invar (36Ni—Fe) the thermal expansion coefficient of which is low. The metal ferrule 106 is made from aluminum the thermal expansion coefficient of which is higher than that of the package proper.

The length of each component is as follows.

The length a of the package 104 (SUS) is 5 mm, the length b of the pipe 105 (Invar) is 8 mm, the length c of the optical fiber 102 is 9 mm, and the length d of the metal ferrule 106 (aluminum) is 4 mm.

The thermal expansion coefficient of each material is as follows.

The thermal expansion coefficient $\alpha 1$ of SUS is $17.1 \times 10^{-6}$ (/K), the thermal expansion coefficient $\alpha 2$ of the glass (glass ferrule) is $0.5 \times 10^{-6}$ (/K), the thermal expansion coefficient $\alpha 1$ of Invar is $1.5 \times 10^{-6}$ (/K), and the thermal expansion coefficient $\alpha 1$ of aluminum is $23.1 \times 10^{-6}$ (/K). The temperature range is $-40$ to $85°$ C. and the device is fabricated and kept at a temperature of $25°$ C. Accordingly, the temperature difference $\Delta T$ is $65°$ C. ($-40$ to $25°$ C.).

By using these values and calculating the expansion/contraction amount $\Delta L1$ of the package proper by equation (1), $\Delta L1 = (17.1 \times 10^{-6} \times 5 + 1.5 \times 10^{-6} \times 8) \times 65 = 6.3$ µm is obtained. By using these values and calculating the expansion/contraction amount $\Delta L2$ of the optical fiber 102 by equation (2), $\Delta L2 = (0.5 \times 10^{-6} \times 9 + 23.1 \times 10^{-6} \times 4) \times 65 = 6.3$ µm is obtained.

In a conventional heating process, a stress is applied to an optical fiber. Therefore, the optical fiber has a deflection not greater than 10 μm. A precision fixing technique is necessary for maintaining and fixing such a deflection. In the optical integrated device 100, the amount of the expansion/contraction of the package proper matches the amount of the expansion/contraction of the optical fiber 102 and ambient temperature does not have an influence on the internal structure of the device. Accordingly, optical fiber deflection is unnecessary. As a result, a high-quality optical integrated device can be assembled easily.

An optical integrated device in which a semiconductor laser and a thermoelectric cooler, together with an optical waveguide chip, are contained in a package as optical parts will now be described.

Figure 3:
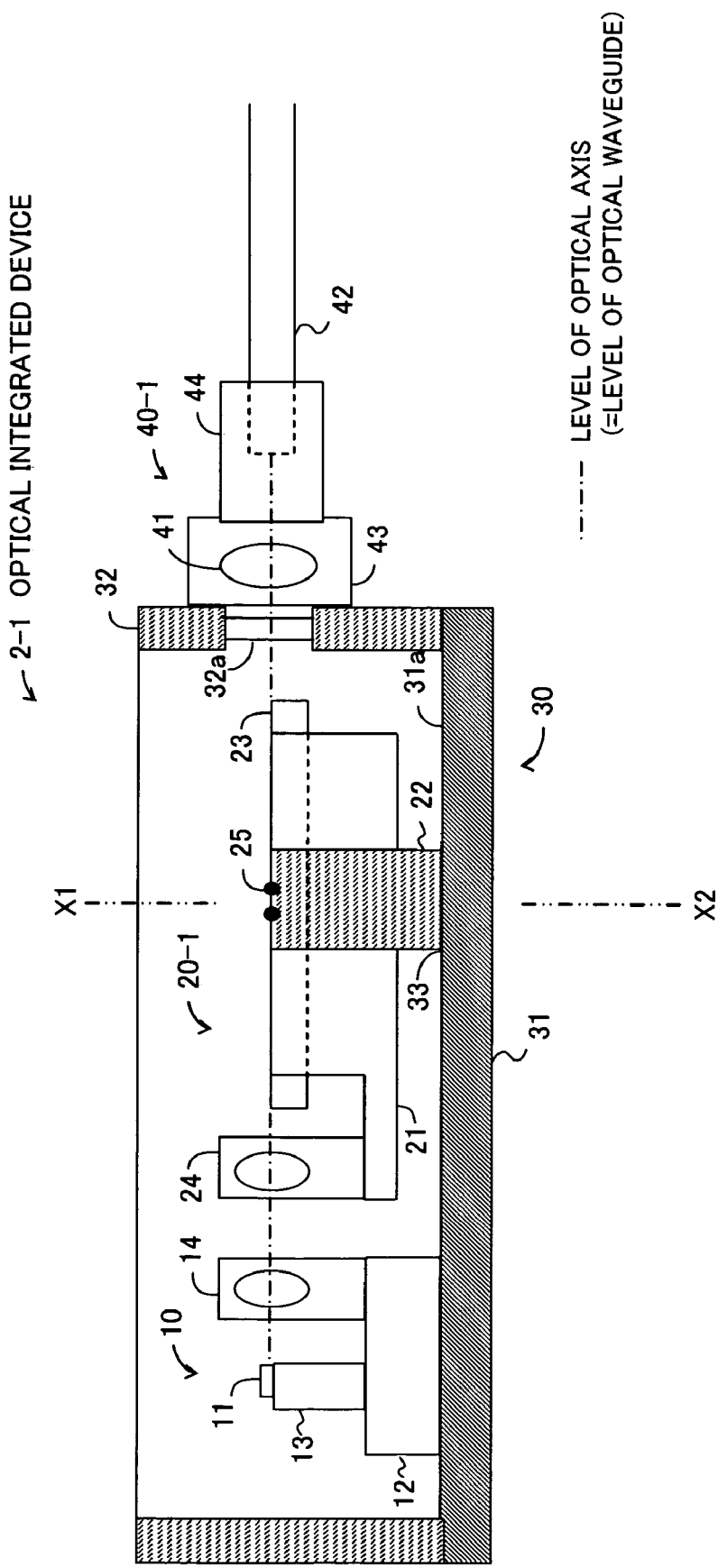
FIG. 3 shows the structure of an optical integrated device according to a first embodiment of the present invention.

FIG. 3 shows the structure of an optical integrated device according to a first embodiment of the present invention. An optical integrated device 2-1 according to a first embodiment of the present invention comprises an optical element unit 10, an optical waveguide unit 20-1, a package 30, and an optical fiber unit 40-1.

The optical element unit 10 includes a photoelectric conversion element 11, a thermoelectric cooler 12, a subcarrier 13, and a lens 14 with a holder. The photoelectric conversion element 11 is a semiconductor laser for converting electrical signals into optical signals. The thermoelectric cooler (TEC) 12 controls the temperature of the photoelectric conversion element 11 to keep the optical output and oscillation wavelength of the photoelectric conversion element 11 constant.

The photoelectric conversion element 11 is located on the subcarrier 13 which is made from, for example, aluminum nitride (AlN) and which is mounted on the thermoelectric cooler 12. The lens 14 with the holder is also mounted on the thermoelectric cooler 12 and converts the optical signals outputted from the photoelectric conversion element 11 into collimated rays. The thermoelectric cooler 12 is fixed onto an inner bottom 31a of the package 30 by, for example, soldering.

The optical waveguide unit 20-1 includes a first holder (holder 21), a second holder (holder 22), an optical waveguide chip 23, and a lens 24 with a holder.

The lens 24 with the holder condenses the optical signals outputted from the lens 14 with the holder at the preceding stage. The optical waveguide chip 23 is an optical modulation element formed by using an LN substrate (the thermal expansion coefficient of which is $16.7 \times 10^{-6}$ (/° C.)) and modulates the optical signals condensed by the lens 24 with the holder.

The lens 24 with the holder and the optical waveguide chip 23 are mounted on the holder 21. The thermal expansion coefficient of the holder 21 is approximately equal to that of the optical waveguide chip 23 (hereinafter the optical waveguide chip 23 will also be referred to as an LN optical modulation element 23). For example, SUS304 (the thermal expansion coefficient of which is $17.3 \times 10^{-6}$ (/° C.)) is used for forming the holder 21. The entire reverse except areas near input and output ends of the optical waveguide chip 23 is fixed to the holder 21 with, for example, an epoxy adhesive.

The holder 22 supports the holder 21 by the sides. The holder 21 is fixed to the holder 22 at local areas 25 (shown by black dots in FIG. 3) at a level equal to that of an optical waveguide on the optical waveguide chip 23 so that the bottom of the holder 21 will not touch another part and so that the holder 21 will be kept in a state in which it is floating in the air.

As stated above, a two-lens system is adopted for optically connecting the photoelectric conversion element 11 and the optical waveguide chip 23. One lens (the lens 14 with the holder) is mounted on the thermoelectric cooler 12 and the other lens (the lens 24 with the holder) is mounted on the holder 21. As a result, optical signals outputted from the photoelectric conversion element 11 are converted into collimated rays by the first lens and the collimated rays are condensed into the optical waveguide by the second lens. By doing so, optical connection is realized.

The package 30 has a bottom portion 31 and a sidewall portion 32. The bottom portion 31 and the sidewall portion 32 are made from different materials. The holder 22 is fixed onto the inner package bottom 31a in the bottom portion 31 at a local area 33. The thermoelectric cooler 12 is also fixed onto the inner package bottom 31a. The thermoelectric cooler 12 is touching the bottom portion 31, so the bottom portion 31 is made from a material (such as CuW-20 (Cu20/W80)) having high heat conductivity to dissipate heat from the thermoelectric cooler 12.

The thermal expansion coefficient of the sidewall portion 32 is approximately equal to that of the holder 22 (the sidewall portion 32 and the holder 22 are made from, for example, Alloy50 (Ni50/Fe50)) and an opening 32a is made in the sidewall portion 32. The bottom portion 31 and the sidewall portion 32 are brazed with, for example, a brazing metal.

The optical fiber unit 40-1 includes a lens 41, an optical fiber 42, a third holder (holder 43), and a fourth holder (holder 44). The holder 43 supports the lens 41. The holder 44 supports the optical fiber 42 and fixes it to the holder 43. After the optical axis of the lens 41 is aligned with that of the optical waveguide, the lens 41 is fixed to the outer surface of the sidewall portion 32 via the holder 43 by, for example, laser spot welding and optically connects with the optical waveguide chip 23 through the opening 32a. In this case, the lens 41 is fixed at a level approximately equal to that of the optical axis.

Figure 4:
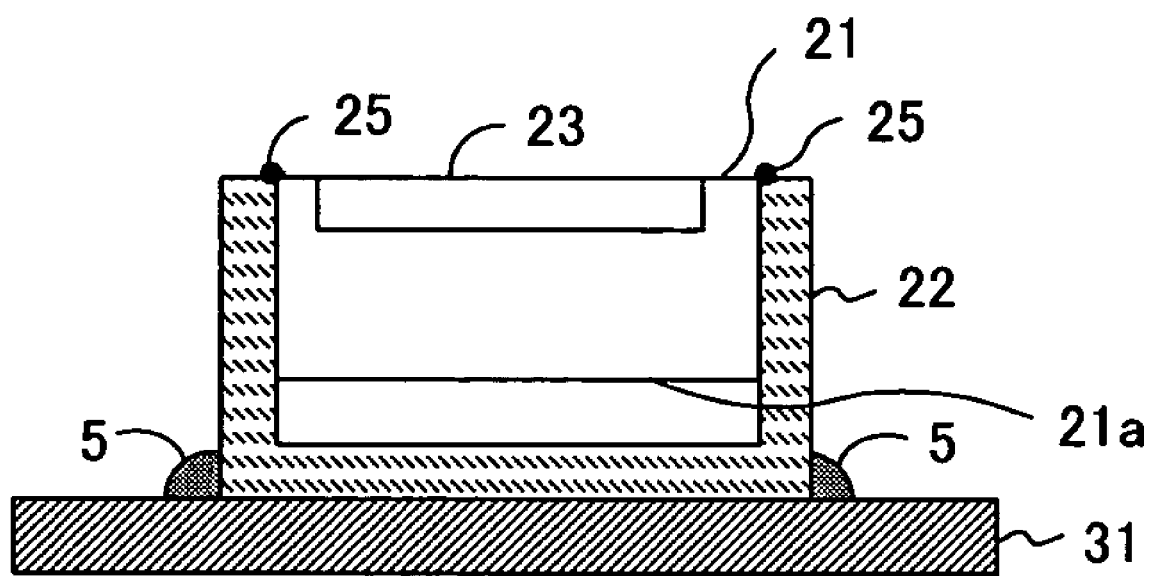
FIG. 4 shows the sectional structure of an optical waveguide unit.

The structure of the holders 21 and 22 included in the optical waveguide unit 20-1 will now be described. FIGS. 4 through 7 show the sectional structure of the optical waveguide unit 20-1 taken along lines X1-X2 of FIG. 3. In FIG. 4, the holder 22 has the shape of the letter "U". The width of the holder 22 is set so that it will rub against the sides of the holder 21.

The holder 21 is fixed to the holder 22 at local areas 25 at a level approximately equal to that of the optical waveguide in the optical waveguide chip 23 by, for example, laser spot welding. In this case, the level of the holder 22 is set so that a reverse 21a of the holder 21 will not touch another part and so that the holder 21 will be kept in a state in which it is floating in the air.

Figure 5:
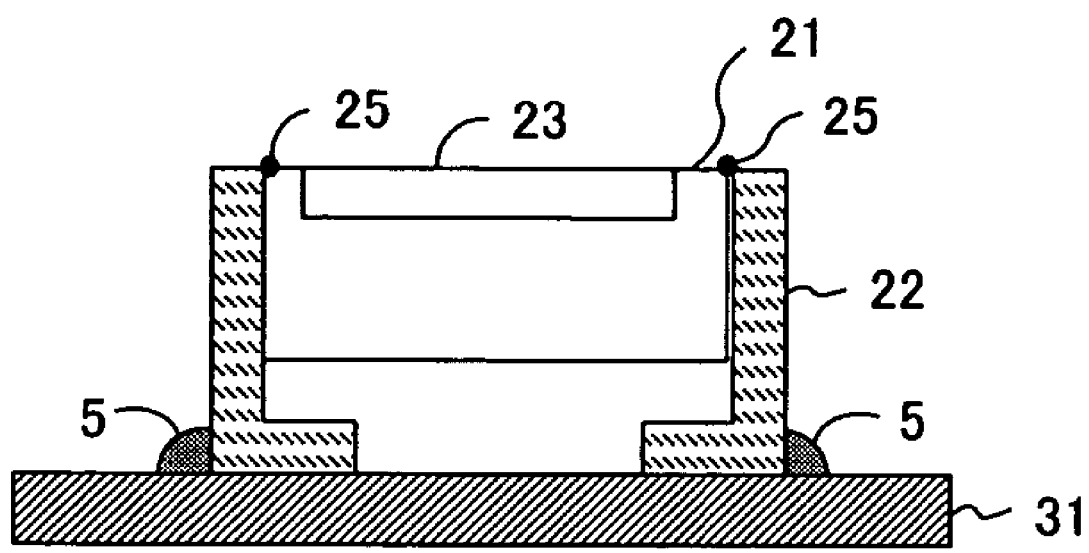
FIG. 5 shows the sectional structure of the optical waveguide unit.
Figure 6:
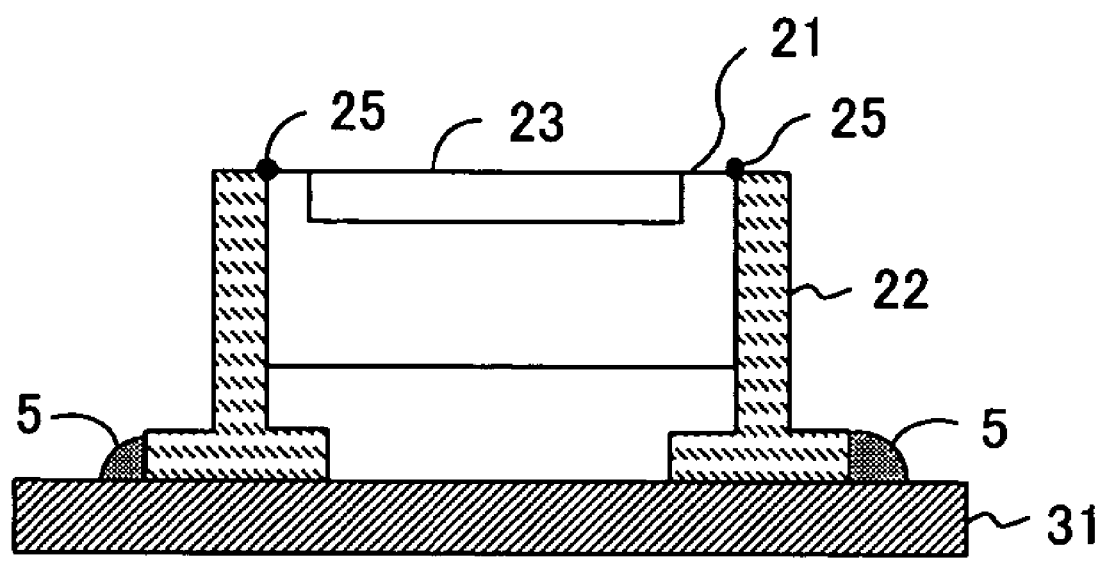
FIG. 6 shows the sectional structure of the optical waveguide unit.
Figure 7:
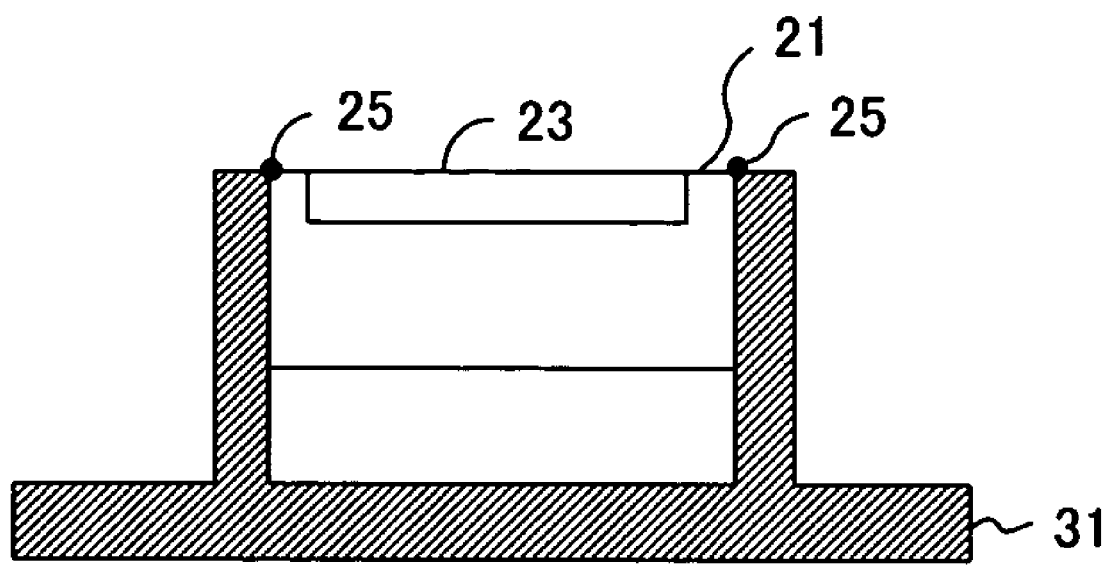
FIG. 7 shows the sectional structure of the optical waveguide unit.

FIGS. 5 through 7 show modifications of the holder 22. In FIG. 5, two holders 22 each having the shape of the letter "L" are shown. In FIG. 6, two holders 22 each having the shape of the letter "T" are shown. In FIG. 7, a holder 22 and a bottom portion 31 of a package 30 are integrally formed in advance.

Figure 8:
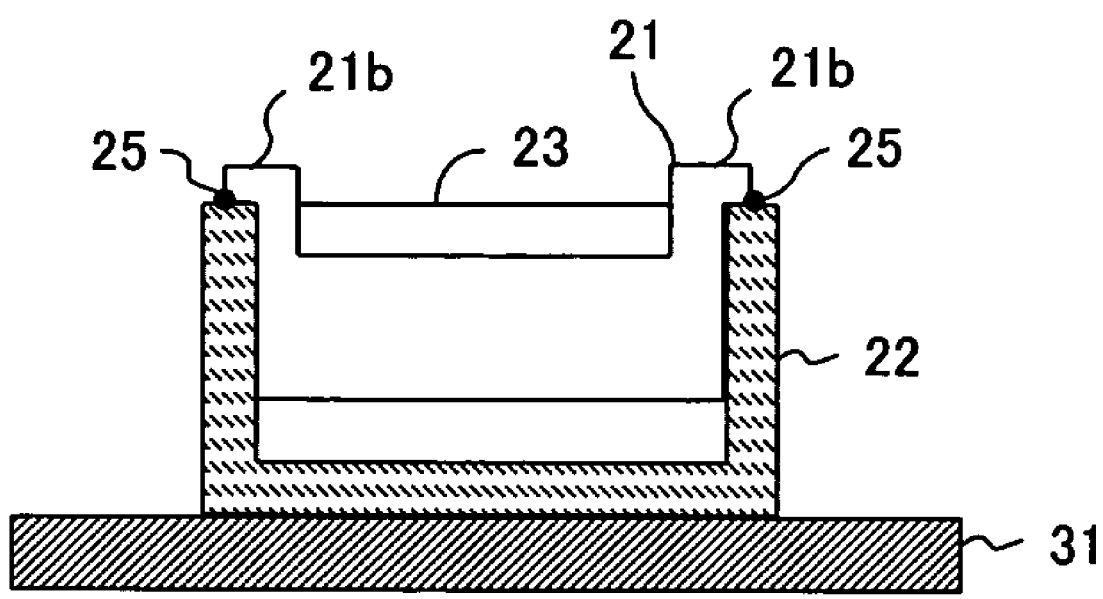
FIG. 8 shows a holder with projections.

FIG. 8 shows a holder 21 with projections. As shown in FIGS. 4 through 7, the holder 21 is fixed to the holder 22 at the local areas 25 at a level approximately equal to that of the optical waveguide. As shown in FIG. 8, this can be performed easily by forming projections 21b for positioning on the holder 21.

That is to say, if a holder 22 has the shape of the letter "U" like the holder 22 shown in FIG. 4, the projections 21b are formed at positions on the holder 21 indicative of the level of an optical waveguide. By hitching the projections 21b on the holder 22, the position in the direction of level of the holder 21 is determined. The holder 21 is fixed to the holder 22 at local areas 25 where the projections 21b are touching the holder 22 by, for example, laser spot welding. By doing so, the holder 21 can be fixed easily at a level approximately equal to that of the optical waveguide.

Figure 9:
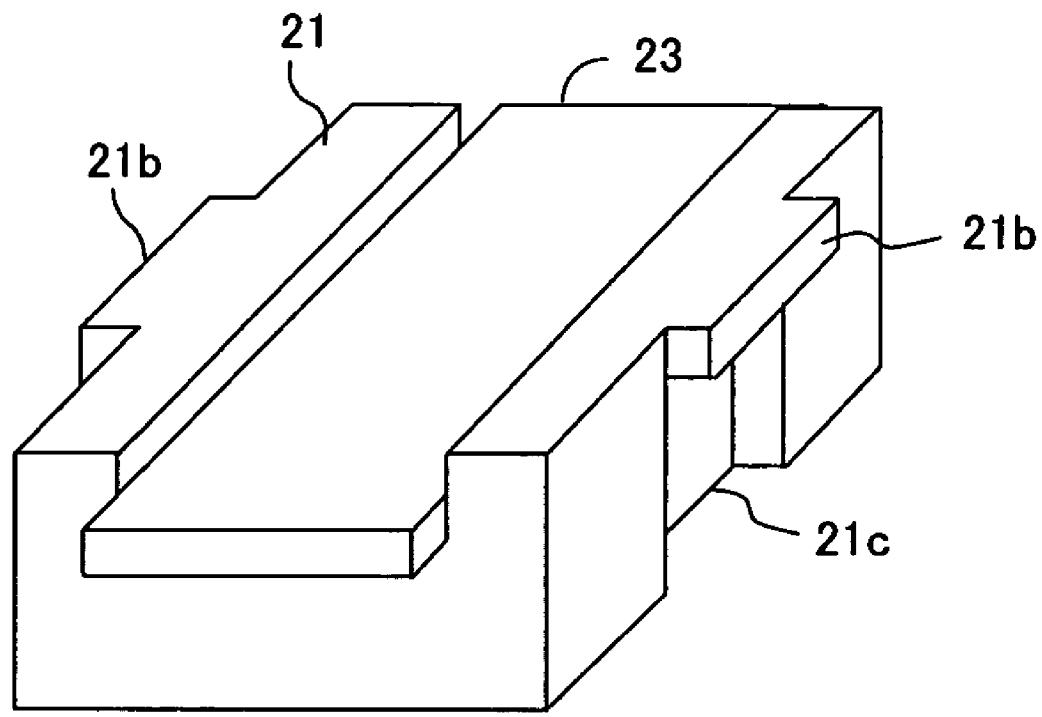
FIG. 9 shows how one holder is fitted into the other holder.
Figure 9:
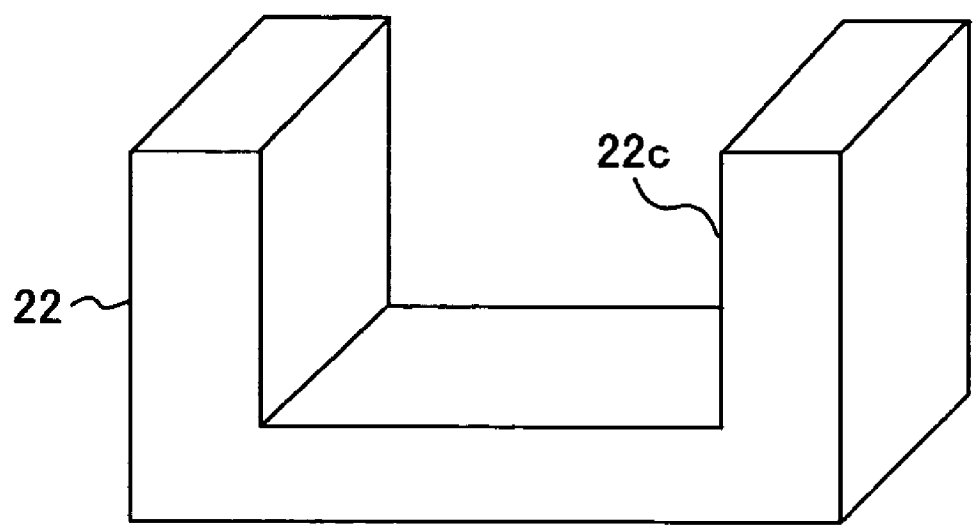

FIG. 9 shows how the holder 21 is fitted into the holder 22. Convex portions 22c are formed in areas on the holder 22 where the holder 22 is to touch the holder 21. Concave portions 21c are formed in areas on the holder 21 where the holder 21 is to touch the holder 22. The holder 21 is inserted into the holder 22 in the direction of level so that the concave portions 21c will fit into the convex portions 22c. By doing so, the convex portions 22c strike the projections 21b. As a result, the positions in the directions of level and an optical axis of the holder 21 can be determined easily.

An area where the holder 22 is fixed to the package 30 will now be described. The holder 22 is fixed onto the inner package bottom 31a in the bottom portion 31 of the package 30. An area where the holder 22 is adhered to the inner package bottom 31a should be small so that the influence of a strain which occurs due to the difference in thermal expansion between them can be ignored.

For example, as shown in FIG. 3, the length in the direction of an optical axis of the holder 22 (the length of the local area 33 in FIG. 3) is set to a significantly small value, an area itself where the holder 22 is touching the inner package bottom 31a is made small, and the holder 22 is adhered to the inner package bottom 31a in the entire area where they are touching. As shown in FIGS. 4 through 6, the holder 22 may be fixed onto the inner package bottom 31a by locally applying an adhesive 5 to corner portions of the holder 22.

Figure 10:
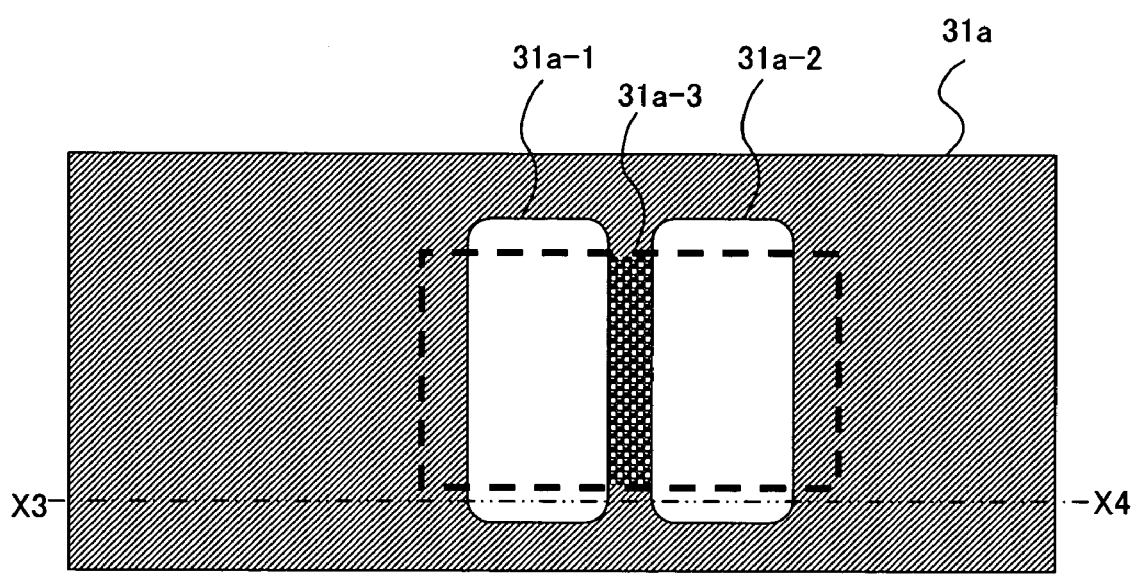
FIG. 10 shows the inner bottom of the package.
Figure 11:
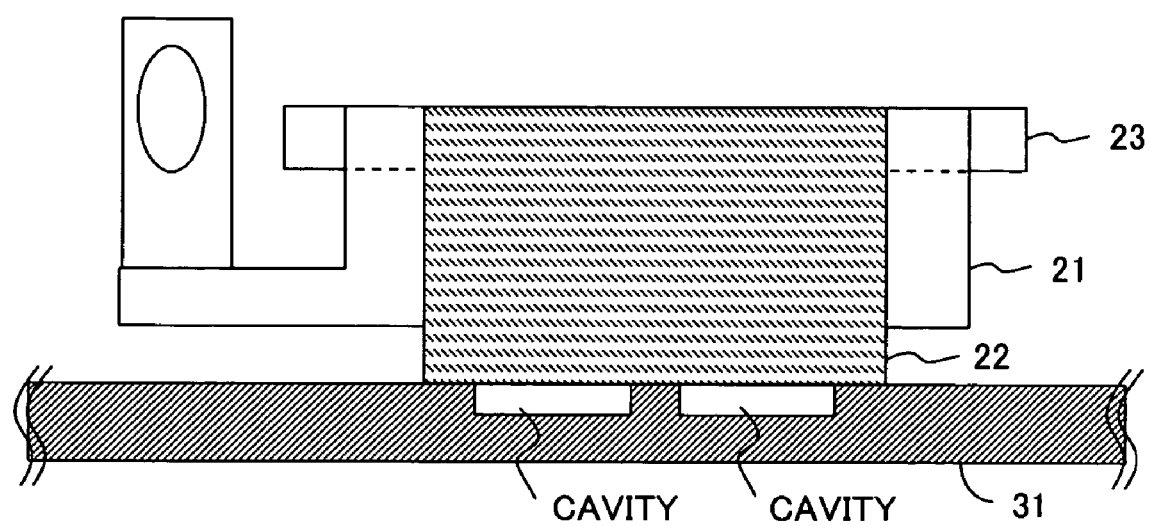
FIG. 11 shows how an optical waveguide chip is fixed onto the inner bottom of the package.

In addition, the holder 22 may be fixed to the package 30 by a method shown in FIGS. 10 and 11. FIG. 10 shows the inner bottom 31a of the package 30. FIG. 11 shows how an optical waveguide chip 23 is fixed onto the inner bottom 31a of the package 30, and is a sectional view taken along lines X3-X4 of FIG. 10.

Concave portions 31a-1 and 31a-2 are formed in an area on the inner package bottom 31a where the holder 22 is to be mounted to narrow an area where the inner package bottom 31a and the holder 22 touch. As a result, the holder 22 is fixed to the inner package bottom 31a in an area 31a-3 where they are touching. In this case, there is no special limit to the length in the direction of the optical axis of the holder 22.

As stated above, in the optical integrated device 2-1, the thermoelectric cooler (TEC) 12 is mounted on the package 30 made from CuW having high heat conductivity, so heat dissipativity can be ensured. The thermal expansion coefficient of the optical waveguide chip 23, being an LN optical modulation element, is $16.7 \times 10^{-6}$ (/° C.) and the thermal expansion coefficient of the bottom portion 31 (CuW) of the package 30 is $8.1 \times 10^{-6}$ (/° C.). There is a great difference in thermal expansion coefficient between them. However, an excessive stress or a crack due to thermal expansion mismatching can be avoided by local fixing.

Moreover, supports for the optical waveguide chip 23, the lens 41, and the optical fiber 42 are made from the same material (Alloy50). That is to say, the optical waveguide chip 23 is supported by the holder 22 made from Alloy50 and the lens 41 and the optical fiber 42 are supported by the sidewall portion 32 made from Alloy50. Therefore, expansion/contraction due to thermal expansion results in the same slight upward/downward movement. As a result, a deviation in optical axis caused by a change in temperature can be avoided.

Figure 12:
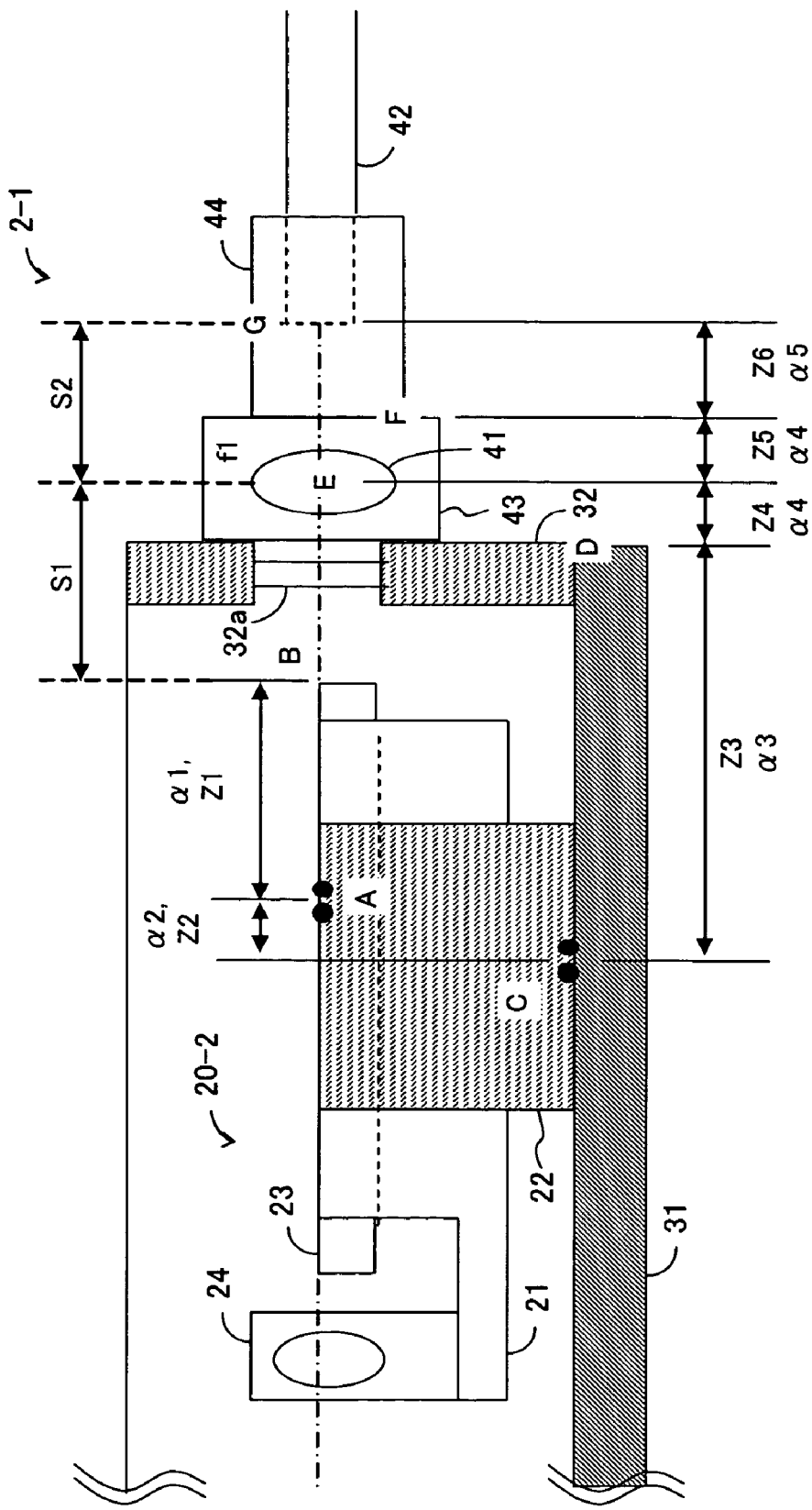
FIG. 12 shows the structure of the optical integrated device according to the first embodiment of the present invention.

A detailed design for the optical integrated device 2-1 will now be described. FIG. 12 shows the structure of the optical integrated device 2-1 according to the first embodiment of the present invention. Symbols that represent the length of each part and the position of each fixing point, being parameters, are as follows.

The focal length of the lens 41 is f1. The distance in the direction of the optical axis between a point A where the holder 21 is fixed to the holder 22 and a point B that indicates the position of an end of the optical waveguide chip 23 which optically connects with the lens 41 is Z1.

The distance in the direction of the optical axis between the point A and a point C where the holder 22 is fixed to the bottom portion 31 is Z2. The distance in the direction of the optical axis between the point C and a point D that indicates the position of the sidewall portion 32 where the lens 41 is fixed is Z3.

The distance in the direction of the optical axis between the point D and a point E that indicates the center of support the holder 43 gives to the lens 41 is Z4. The distance in the direction of the optical axis between the point E and a point F where the holder 44 is fixed to the holder 43 is Z5.

The distance in the direction of the optical axis between the point F and a point G that indicates a position where the end of the optical fiber 42 is supported by the holder 44 is Z6. The distance in the direction of the optical axis between the points B and E is S1. The distance in the direction of the optical axis between the points E and G is S2.

The thermal expansion coefficients of the optical waveguide chip 23, the holder 21, the bottom portion 31, the holder 43, and the holder 44 are $\alpha 1$, $\alpha 2$, $\alpha 3$, $\alpha 4$, and $\alpha 5$ respectively. S1 and S2 at a reference temperature are S10 and S20 respectively. The amount of a temperature change from the reference temperature is $\Delta T$.

The length of the optical waveguide chip (LN optical modulation element) 23 is 50 mm and the focal length f1 of the lens 41 is 4 mm. The spot size of the optical waveguide chip 23 is about 4 μm and the spot size of the optical fiber 42 is about 4.5 μm. Accordingly, the beam magnification of a coupling system including the lens 41 is set to one and the distance S1 between the end of the optical waveguide chip 23 and the principal point of the lens 41 and the distance S2 between the principal point of the lens 41 and the end of the optical fiber 42 are set to 8 mm. FIG. 13 shows the concrete numerical values of parameters. In FIG. 13, sections, materials used in the sections, the thermal expansion coefficients of the materials, and distances in the direction of the optical axis are shown (these numerical values are determined with consideration for conditional expressions (3a) through (3c) described later).

If a material for each part, the length of each part, and the position of each fixing point are set in the this way, then a lens coupling formula is given by expression (3a) and the thermal expansion/contraction values of S1 and S2 can be calculated by expressions (3b) and (3c) respectively. When the point A is on the side of the point B with the point C as a reference, the value of Z2 is positive. When the point A is on the opposite side of the point B with the point C as a reference, the value of Z2 is negative.

$$\frac{1}{S1} + \frac{1}{S2} = \frac{1}{f1} \tag{3a}$$

$$S1 = S10 + (\alpha 3 \times Z3 + \alpha 4 \times Z4 - \alpha 1 \times Z1 - \alpha 2 \times Z2) \times \Delta T \tag{3b}$$

$$S2 = S20 + (\alpha 4 \times Z5 + \alpha 5 \times Z6) \times \Delta T \tag{3c}$$

Figure 14:
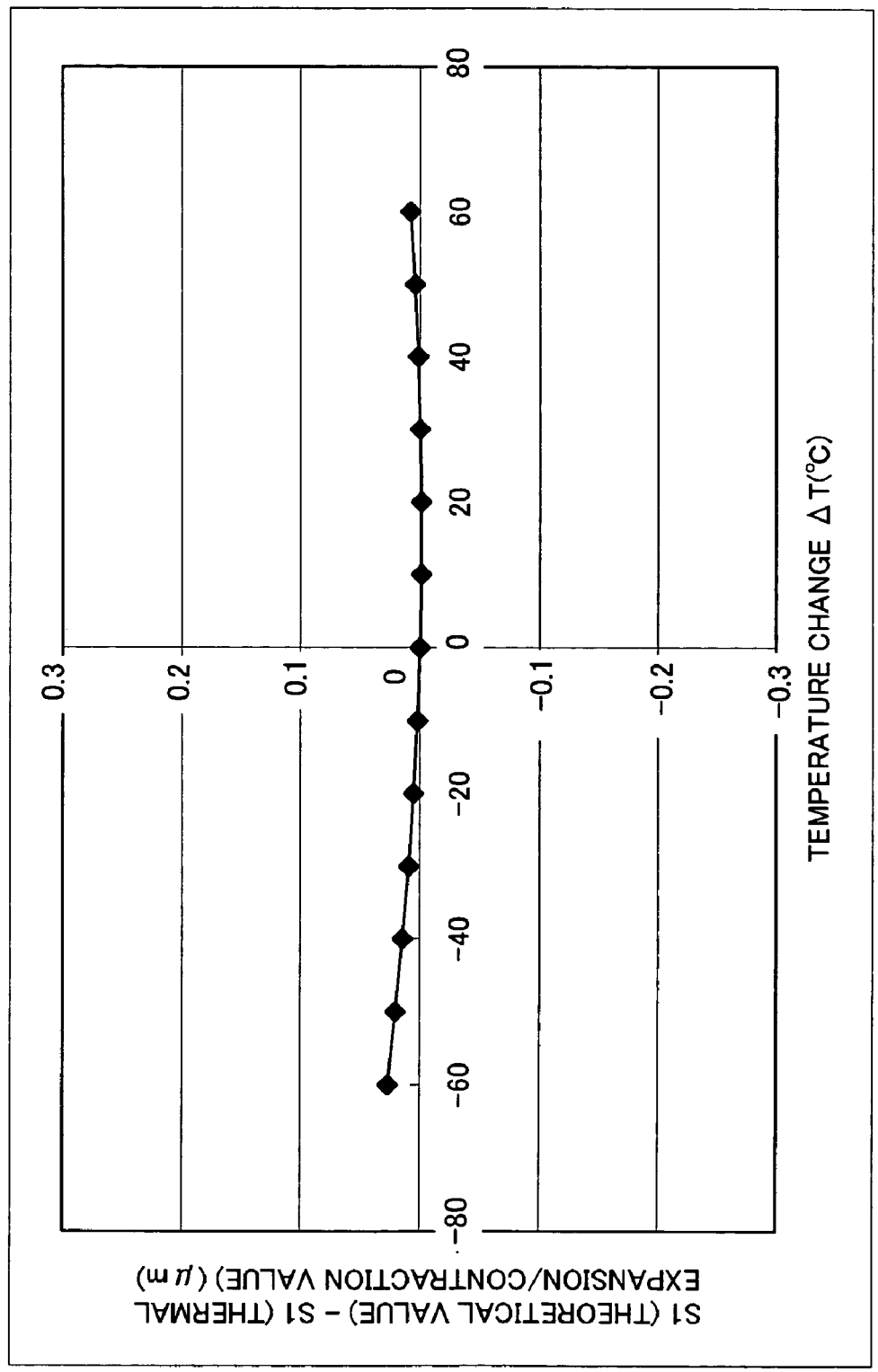
FIG. 14 shows the difference between theoretical values and experimental values in thermal expansion/contraction.

FIG. 14 shows the difference between theoretical values and experimental values in thermal expansion/contraction. In FIG. 14, a horizontal axis indicates temperature changes and a vertical axis indicates the difference between theoretical values and experimental values in thermal expansion/contraction. In a reference temperature range of from −60° C. to +60° C., S1 (theoretical value) that satisfies lens coupling expression (3a) is found by using S2 (thermal expansion/contraction value) calculated by expression (3c). In addition, S1 (thermal expansion/contraction value) is calculated by expression (3b) A graph shown in FIG. 13 is obtained by calculating (S1 (theoretical value)−S1 (thermal expansion/contraction value)).

The results obtained indicate that if the numerical values shown in FIG. 13 are used, S1 (amount of thermal expansion/contraction) is approximately equal to a theoretical value with an error smaller than or equal to 0.03 μm. That is to say, the distance in the direction of the optical axis between the optical waveguide chip 23 and the lens 41 and the distance in the direction of the optical axis between the lens 41 and the optical fiber 42 always satisfy lens coupling expression (3a) in a reference temperature range of from −60° C. to +60° C. Therefore, characteristic variations due to a change in temperature (variations in optical coupling characteristic due to variations in the direction of the optical axis) can be restrained.

Figure 15:
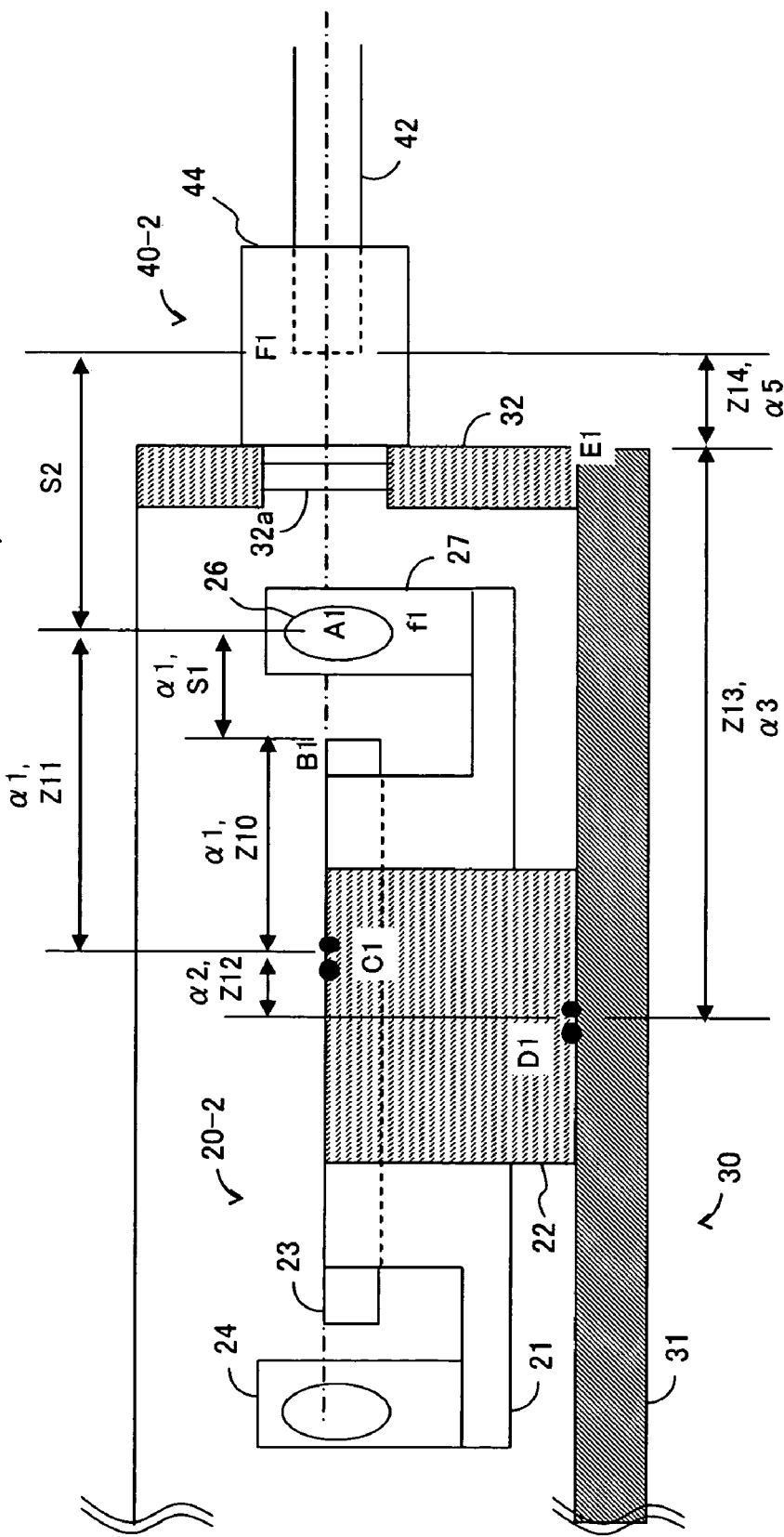
FIG. 15 shows the structure of an optical integrated device according to a second embodiment of the present invention.

An optical integrated device according to a second embodiment of the present invention will now be described. FIG. 15 shows the structure of an optical integrated device according to a second embodiment of the present invention. An optical integrated device 2-2 according to a second embodiment of the present invention comprises an optical element unit, an optical waveguide unit 20-2, a package 30, and an optical fiber unit 40-2. The optical element unit is the same as the optical element unit 10 included in the optical integrated device 2-1 according to the first embodiment of the present invention and is not shown.

The basic structure of the optical integrated device 2-2 according to the second embodiment of the present invention is the same as that of the optical integrated device 2-1 according to the first embodiment of the present invention shown in FIG. 3. In the optical integrated device 2-1, the lens is fixed to the outer surface of the sidewall portion of the package. In the optical integrated device 2-2, however, a lens is located in the package. In this respect the optical integrated device 2-2 differs from the optical integrated device 2-1.

The optical waveguide unit 20-2 includes a first holder (holder 21), a second holder (holder 22), a third holder (holder 27), an optical waveguide chip 23, a lens 24 with a holder, and a lens 26.

The optical waveguide chip 23 (hereinafter the optical waveguide chip 23 will also be referred to as an LN optical modulation element 23) is an optical modulation element formed by using an LN substrate (the thermal expansion coefficient of which is 16.7×10⁻⁶ (/° C.)). The thermal expansion coefficient of the holder 21 is approximately equal to that of the LN optical modulation element 23. For example, SUS304 (the thermal expansion coefficient of which is 17.3×10⁻⁶ (/° C.)) is used for forming the holder 21. The entire reverse except areas near input and output ends of the LN optical modulation element 23 is fixed to the holder 21 with, for example, an epoxy adhesive.

The holder 22 has the shape of the letter "U". The width of the holder 22 is set so that it will rub against the sides of the holder 21. The holder 21 is fixed to the holder 22 at local areas at a level approximately equal to that of an optical waveguide in the LN optical modulation element 23 by, for example, laser spot welding. In this case, the level of the holder 22 is set so that the bottom of the holder 21 will not touch another part and so that the holder 21 will be kept in a state in which it is floating in the air.

The modifications shown in FIGS. 4 through 11 may be used as the structure of the holder 22, a method for determining the positions of the holders 21 and 22, and a method for fixing the holder 22 to the inner bottom of the package.

The lens 26 is supported by the holder 27 and is fixed to the holder 21. The holder 27 is made from SUS304 that is used for making the holder 21 to make their thermal expansion coefficients equal. The lens 26 should be fixed to the holder 27 at a level, at least, approximately equal to that of an optical axis by, for example, laser spot welding.

An optical fiber 42 is supported by a holder 44. After the optical axis of the optical fiber 42 is aligned with that of the optical waveguide, the optical fiber 42 is fixed to an opening 32a made in a sidewall portion 32 of the package 30 by, for example, laser spot welding. The optical fiber 42 is fixed at a level approximately equal to that of the optical axis. A photoelectric conversion element (not shown) can be connected optically to the LN optical waveguide by adopting the same structure that is shown in FIG. 3.

The package 30 has a bottom portion 31 and the sidewall portion 32 which are made from different materials. The bottom portion 31 is made from CuW-20 (Cu20/W80) having high heat conductivity. The same material is used for making the sidewall portion 32 and the holder 22 to make their thermal expansion coefficients equal. In this case, Kovar (Fe54/Co17/Ni29) is used. The bottom portion 31 and the sidewall portion 32 are brazed with, for example, a brazing metal.

As stated above, in the optical integrated device 2-2, a thermoelectric cooler (TEC) (not shown) is mounted on the bottom portion 31 made from CuW having high heat conductivity, so heat dissipativity can be ensured. The thermal expansion coefficient of the LN optical modulation element 23 is 16.7×10⁻⁶ (/° C.) and the thermal expansion coefficient of the bottom portion 31 (CuW) of the package 30 is 8.1×10⁻⁶ (/° C.). There is a great difference in thermal expansion coefficient between them. However, an excessive stress or a crack due to thermal expansion mismatching can be avoided by local fixing.

The holders 21 and 27 are made from the same material, so their thermal expansion coefficients are equal. Accordingly, even if expansion/contraction occurs due to thermal expansion, the relative positions in the direction of level of the LN optical waveguide and the lens 26 hardly change. As a result, a deviation in optical axis between them caused by a change in temperature can be avoided.

In addition, the supports of the LN optical modulation element 23 and the optical fiber 42 are made from the same material (Kovar). Therefore, expansion/contraction due to thermal expansion results in the same slight upward/downward movement. As a result, a deviation in optical axis caused by a change in temperature can be avoided. That is to say, expansion/contraction due to thermal expansion results in the same slight upward/downward movement of the optical axes of the optical waveguide, the lens 26, and the optical fiber 42. As a result, a deviation in optical axis caused by a change in temperature can be avoided.

A detailed design for the optical integrated device 2-2 will now be described. Symbols that represent the length of each part and the position of each fixing point, being parameters, are as follows.

The focal length of the lens 26 is f1. The distance in the direction of the optical axis between a point A1 that indicates the center of support the holder 27 gives to the lens 26 and a point B1 that indicates the position of an end of the optical waveguide chip 23 which optically connects with the lens 26 is S1.

The distance in the direction of the optical axis between the point B1 and a point C1 where the holder 21 is fixed to the holder 22 is Z10. The distance in the direction of the optical axis between the points A1 and C1 is Z11. The distance in the direction of the optical axis between the point C1 and a point D1 where the holder 22 is fixed onto the bottom portion 31 is Z12.

The distance in the direction of the optical axis between the point D1 and a point E1 that indicates the position of the sidewall portion 32 where the optical fiber 42 is fixed is Z13. The distance in the direction of the optical axis between the point E1 and a point F1 that indicates a position where the end of the optical fiber 42 is supported by the holder 44 is Z14.

The distance in the direction of the optical axis between the points A1 and F1 is S2. The thermal expansion coefficients of the optical waveguide chip 23 and the holder 21 are α1. The thermal expansion coefficients of the holder 22, the bottom portion 31, and the holder 44 are α2, α3, and α5 respectively. S1 and S2 at a reference temperature are S10 and S20 respectively. The amount of a temperature change from the reference temperature is ΔT.

The length of the LN optical modulation element 23 is 50 mm and the focal length f1 of the lens 26 is 3 mm. The spot size of the LN optical modulation element 23 is about 3 μm and the spot size of the optical fiber 42 is about 4.5 μm. Accordingly, the beam magnification of a coupling system including the lens 26 is set to one and a half. The distance S1 between the end of the LN optical modulation element 23 and the principal point of the lens 26 is set to 5 mm and the distance S2 between the principal point of the lens 26 and the end of the optical fiber 42 is set to 7.5 mm. FIG. 16 shows the concrete numerical values of parameters. In FIG. 16, sections, materials used in the sections, the thermal expansion coefficients of the materials, and distances in the direction of the optical axis are shown (these numerical values are determined with consideration for conditional expressions (4a) through (4c) described later).

If a material for each part, the length of each part, and the position of each fixing point are set in the this way, then a lens coupling formula is given by expression (4a) and the thermal expansion/contraction values of S1 and S2 can be calculated by expressions (4b) and (4c) respectively. When the point C1 is on the side of the point B1 with the point D1 as a reference, the value of Z12 is positive. When the point C1 is on the opposite side of the point B1 with the point D1 as a reference, the value of Z12 is negative.

$$\frac{1}{S1} + \frac{1}{S2} = \frac{1}{f1} \quad (4a)$$

-continued $$S1 = S10 + \alpha 1 \times S1 \times \Delta T \quad (4b)$$

$$S2 = S20 + (\alpha 3 \times Z13 + \alpha 5 \times Z14 - \alpha 1 \times Z11 - \alpha 2 \times Z12) \times \Delta T \quad (4c)$$

Figure 17:
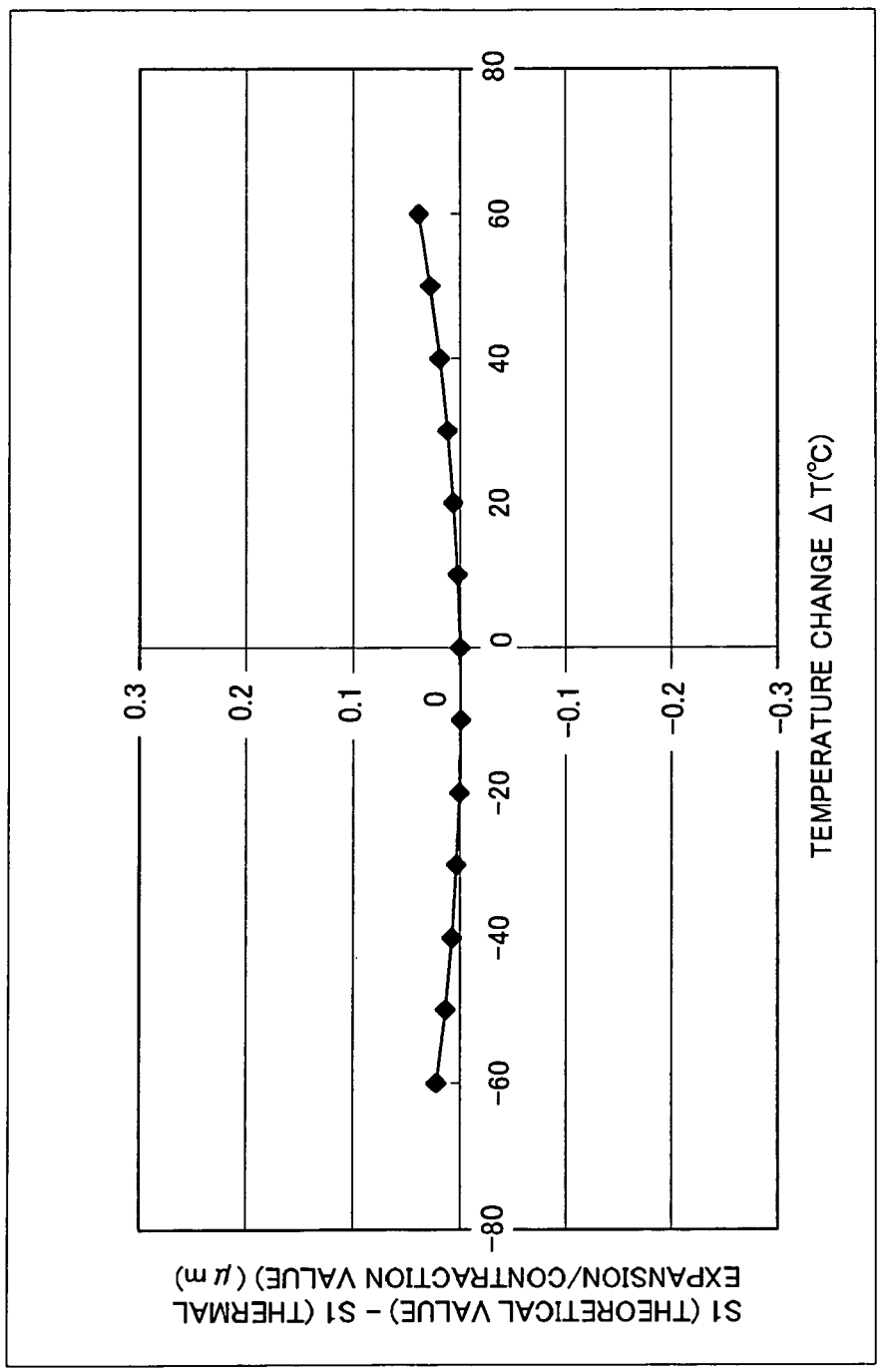
FIG. 17 shows the difference between theoretical values and experimental values in thermal expansion/contraction.

FIG. 17 shows the difference between theoretical values and experimental values in thermal expansion/contraction. In FIG. 17, a horizontal axis indicates temperature changes and a vertical axis indicates the difference between theoretical values and experimental values in thermal expansion/contraction. In a reference temperature range of from −60° C. to +60° C., S1 (theoretical value) that satisfies lens coupling expression (4a) is found by using S2 (thermal expansion/contraction value) calculated by expression (4c). In addition, S1 (thermal expansion/contraction value) is calculated by expression (4b). A graph shown in FIG. 17 is obtained by calculating (S1 (theoretical value)—S1 (thermal expansion/contraction value)).

The results obtained indicate that if the numerical values shown in FIG. 16 are used, S1 (thermal expansion/contraction value) is approximately equal to a theoretical value with an error smaller than or equal to 0.04 μm. That is to say, the distance in the direction of the optical axis between the optical waveguide chip 23 and the lens 26 and the distance in the direction of the optical axis between the lens 26 and the optical fiber 42 always satisfy lens coupling expression (4a) in a reference temperature range of from −60° C. to +60° C. Therefore, characteristic variations due to a change in temperature (variations in optical coupling characteristic due to variations in the direction of the optical axis) can be restrained.

Figure 18:
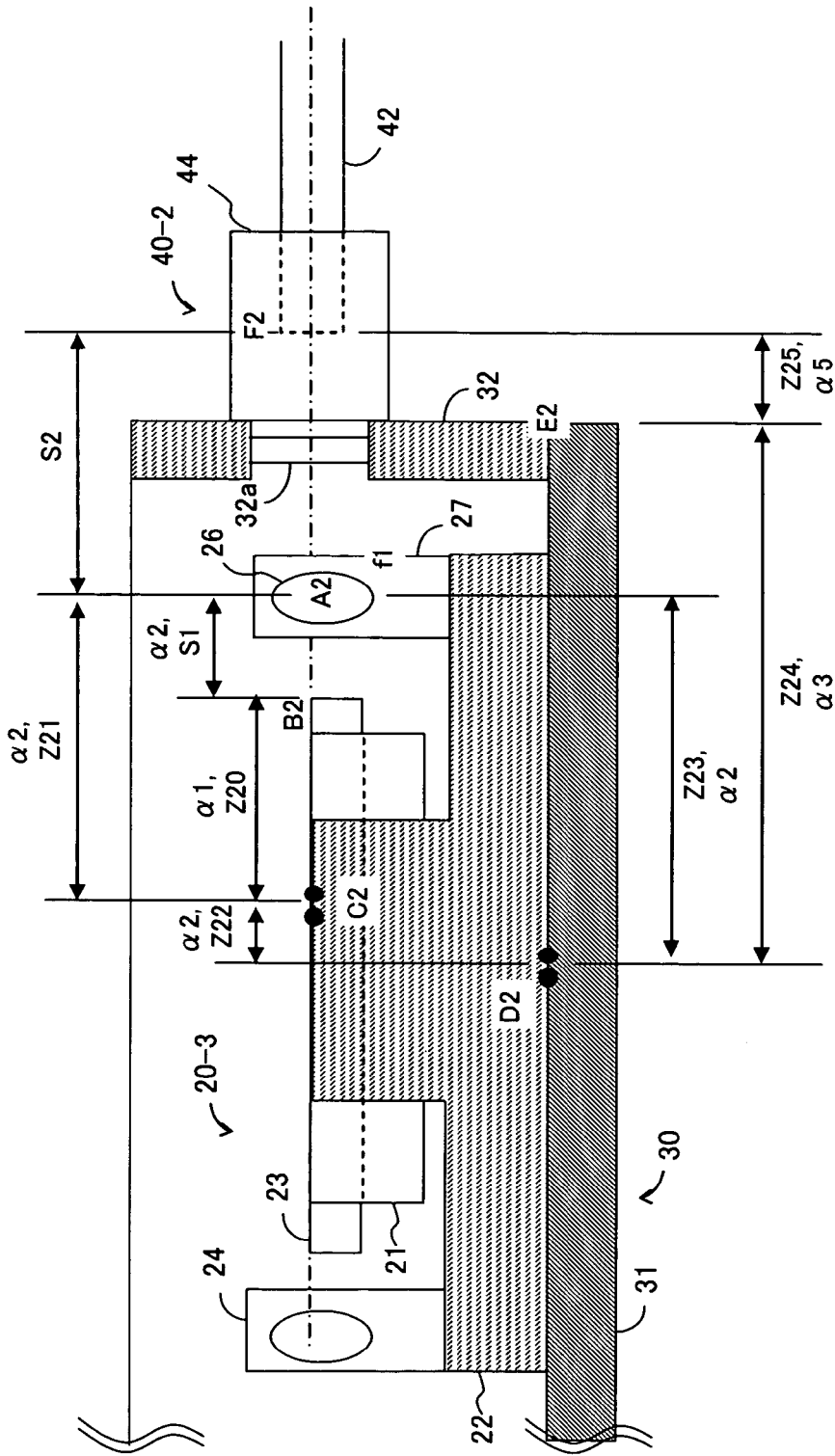
FIG. 18 shows the structure of an optical integrated device according to a third embodiment of the present invention.

An optical integrated device according to a third embodiment of the present invention will now be described. FIG. 18 shows the structure of an optical integrated device according to a third embodiment of the present invention. An optical integrated device 2-3 according to a third embodiment of the present invention comprises an optical element unit, an optical waveguide unit 20-3, a package 30, and an optical fiber unit 40-2. The optical element unit is the same as the optical element unit 10 included in the optical integrated device 2-1 according to the first embodiment of the present invention and is not shown.

The basic structure of the optical integrated device 2-3 according to the third embodiment of the present invention is the same as that of the optical integrated device 2-2 according to the second embodiment of the present invention shown in FIG. 15. In the optical integrated device 2-2 according to the second embodiment of the present invention, the lens 26 is mounted on the holder 21. In the optical integrated device 2-3 according to the third embodiment of the present invention, however, a lens 26 is mounted on a holder 22. In this respect the optical integrated device 2-3 differs from the optical integrated device 2-2.

An optical waveguide chip 23 (hereinafter the optical waveguide chip 23 will also be referred to as an InP optical waveguide element 23) is an optical waveguide element formed by using an InP substrate (the thermal expansion coefficient of which is $4.5 \times 10^{-6}$ (/° C.)). The thermal expansion coefficient of a holder 21 is approximately equal to that of the InP optical waveguide element 23. For example, Kovar (the thermal expansion coefficient of which is $5.3 \times 10^{-6}$ (/° C.)) is used for forming the holder 21. The entire reverse except areas near input and output ends of the InP optical waveguide element 23 is fixed to the holder 21 with, for example, an epoxy adhesive.

The holder 22 has the shape of the letter "U". The width of the holder 22 is set so that it will rub against the sides of the holder 21. The holder 21 is fixed to the holder 22 at local areas at a level approximately equal to that of an optical waveguide in the InP optical waveguide element 23 by, for example, laser spot welding. In this case, the level of the holder 22 is set so that the bottom of the holder 21 will not touch another part and so that the holder 21 will be kept in a state in which it is floating in the air.

The modifications shown in FIGS. 4 through 11 may be used as the structure of the holder 22, a method for determining the positions of the holders 21 and 22, and a method for fixing the holder 22 onto the inner bottom of the package.

The lens 26 is supported by a holder 27 and is fixed to the holder 22. The holder 27 is made from Alloy42 that is used for making the holder 22 to make their thermal expansion coefficients equal. The lens 26 is fixed to the holder 27 at a level, at least, approximately equal to that of an optical axis by, for example, laser spot welding.

An optical fiber 42 is supported by a holder 44 (Alloy42). After the optical axis of the optical fiber 42 is aligned with that of the optical waveguide, the optical fiber 42 is fixed to an opening 32a made in a sidewall portion 32 of the package 30 by, for example, laser spot welding. The optical fiber 42 is fixed at a level approximately equal to that of the optical axis. A photoelectric conversion element (not shown) can be connected optically to the InP optical waveguide by adopting the same structure that is shown in FIG. 3.

The package 30 has a bottom portion 31 and the sidewall portion 32 which are made from different materials. The bottom portion 31 is made from CuW-15 (Cu15/W85) having high heat conductivity. The same material is used for making the sidewall portion 32 and the holder 22 to make their thermal expansion coefficients equal. In this case, Alloy42 is used. The bottom portion 31 and the sidewall portion 32 are brazed with, for example, a brazing metal.

As stated above, in the optical integrated device 2-3, a thermoelectric cooler (TEC) (not shown) is mounted on the bottom portion 31 made from CuW having high heat conductivity, so heat dissipativity can be ensured. The thermal expansion coefficient of the InP optical waveguide element 23 is $4.5 \times 10^{-6}$ (/° C.) and the thermal expansion coefficient of the bottom portion 31 (CuW) of the package 30 is $6.5 \times 10^{-6}$ (/° C.). There is a difference in thermal expansion coefficient between them. However, an excessive stress or a crack due to thermal expansion mismatching can be avoided by local fixing.

The holders 22 and 27 are made from the same material, so their thermal expansion coefficients are equal. Accordingly, expansion/contraction due to thermal expansion results in the same slight upward/downward movement of the InP optical waveguide and the lens 26. As a result, a deviation in optical axis between them caused by a change in temperature can be avoided.

In addition, the supports of the InP optical waveguide element 23 and the optical fiber 42 are made from the same material (Alloy42). Therefore, expansion/contraction due to thermal expansion results in the same slight upward/downward movement. As a result, a deviation in optical axis caused by a change in temperature can be avoided. That is to say, expansion/contraction due to thermal expansion results in the same slight upward/downward movement of the optical axes of the optical waveguide, the lens 26, and the optical fiber 42. As a result, a deviation in optical axis caused by a change in temperature can be avoided.

A detailed design for the optical integrated device 2-3 will now be described. Symbols that represent the length of each part and the position of each fixing point, being parameters, are as follows.

The focal length of the lens 26 is f1. The distance in the direction of the optical axis between a point A2 that indicates the center of support the holder 27 gives to the lens 26 and a point B2 that indicates the position of an end of the optical waveguide chip 23 which optically connects with the lens 26 is S1.

The distance in the direction of the optical axis between the point B2 and a point C2 where the holder 21 is fixed to the holder 22 is Z20. The distance in the direction of the optical axis between the points A2 and C2 is Z21. The distance in the direction of the optical axis between the point C2 and a point D2 where the holder 22 is fixed onto the bottom portion 31 is Z22.

The distance in the direction of the optical axis between the points A2 and D2 is Z23. The distance in the direction of the optical axis between the point D2 and a point E2 that indicates the position of the sidewall portion 32 where the optical fiber 42 is fixed is Z24. The distance in the direction of the optical axis between the point E2 and a point F2 that indicates a position where the end of the optical fiber 42 is supported by the holder 44 is Z25.

The distance in the direction of the optical axis between the points A2 and F2 is S2. The thermal expansion coefficients of the optical waveguide chip 23 and the holder 21 are α1. The thermal expansion coefficients of the holder 22, the bottom portion 31, and the holder 44 are α2, α3, and α5 respectively. S1 and S2 at a reference temperature are S10 and S20 respectively. The amount of a temperature change from the reference temperature is ΔT.

The length of the InP optical waveguide element 23 is 10 mm and the focal length f1 of the lens 26 is 1 mm. The spot size of the InP optical waveguide element 23 is about 1 μm and the spot size of the optical fiber 42 is about 4.5 μm. Accordingly, the beam magnification of a coupling system including the lens 26 is set to four. The distance S1 between the end of the InP optical waveguide element 23 and the principal point of the lens 26 is set to 1.25 mm and the distance S2 between the principal point of the lens 26 and the end of the optical fiber 42 is set to 5 mm. FIG. 19 shows the concrete numerical values of parameters. In FIG. 19, sections, materials used in the sections, the thermal expansion coefficients of the materials, and distances in the direction of the optical axis are shown (these numerical values are determined with consideration for conditional expressions (5a) through (5c) described later).

If a material for each part, the length of each part, and the position of each fixing point are set in the this way, then a lens coupling formula is given by expression (5a) and the thermal expansion/contraction values of S1 and S2 can be calculated by expressions (5b) and (5c) respectively. When the point C2 is on the side of the point B2 with the point D2 as a reference, the value of Z22 is positive. When the point C2 is on the opposite side of the point B2 with the point D2 as a reference, the value of Z22 is negative.

$$\frac{1}{S1} + \frac{1}{S2} = \frac{1}{f1} \tag{5a}$$

$$S1 = S10 + (\alpha2 \times Z21 - \alpha1 \times Z20) \times \Delta T \tag{5b}$$

-continued $$S2 = S20 + (\alpha3 \times Z24 + \alpha5 \times Z25 - \alpha2 \times Z23) \times \Delta T \quad (5c)$$

Figure 20:
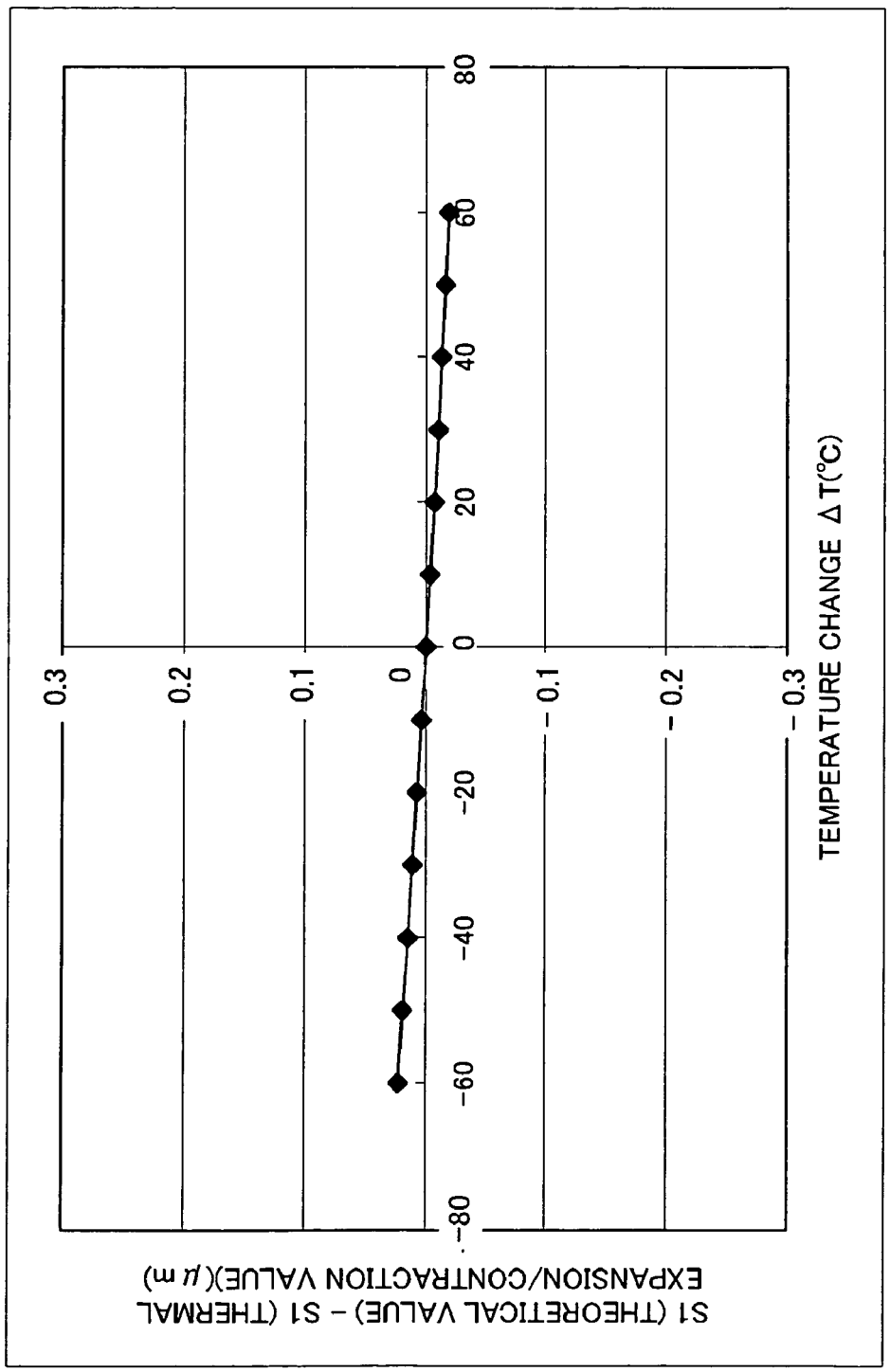
FIG. 20 shows the difference between theoretical values and experimental values in thermal expansion/contraction.

FIG. 20 shows the difference between theoretical values and experimental values in thermal expansion/contraction. In FIG. 20, a horizontal axis indicates temperature changes and a vertical axis indicates the difference between theoretical values and experimental values in thermal expansion/contraction. In a reference temperature range of from −60° C. to +60° C., S1 (theoretical value) that satisfies lens coupling expression (5a) is found by using S2 (thermal expansion/contraction value) calculated by expression (5c). In addition, S1 (thermal expansion/contraction value) is calculated by expression (5b). A graph shown in FIG. 20 is obtained by calculating (S1 (theoretical value)−S1 (thermal expansion/contraction value)).

The results obtained indicate that if the numerical values shown in FIG. 19 are used, S1 (thermal expansion/contraction value) is approximately equal to a theoretical value with an error smaller than or equal to 0.03 μm. That is to say, the distance in the direction of the optical axis between the optical waveguide chip 23 and the lens 26 and the distance in the direction of the optical axis between the lens 26 and the optical fiber 42 always satisfy lens coupling expression (5a) in a reference temperature range of from −60° C. to +60° C. Therefore, characteristic variations due to a change in temperature (variations in optical coupling characteristic due to variations in the direction of the optical axis) can be restrained.

Figure 21:
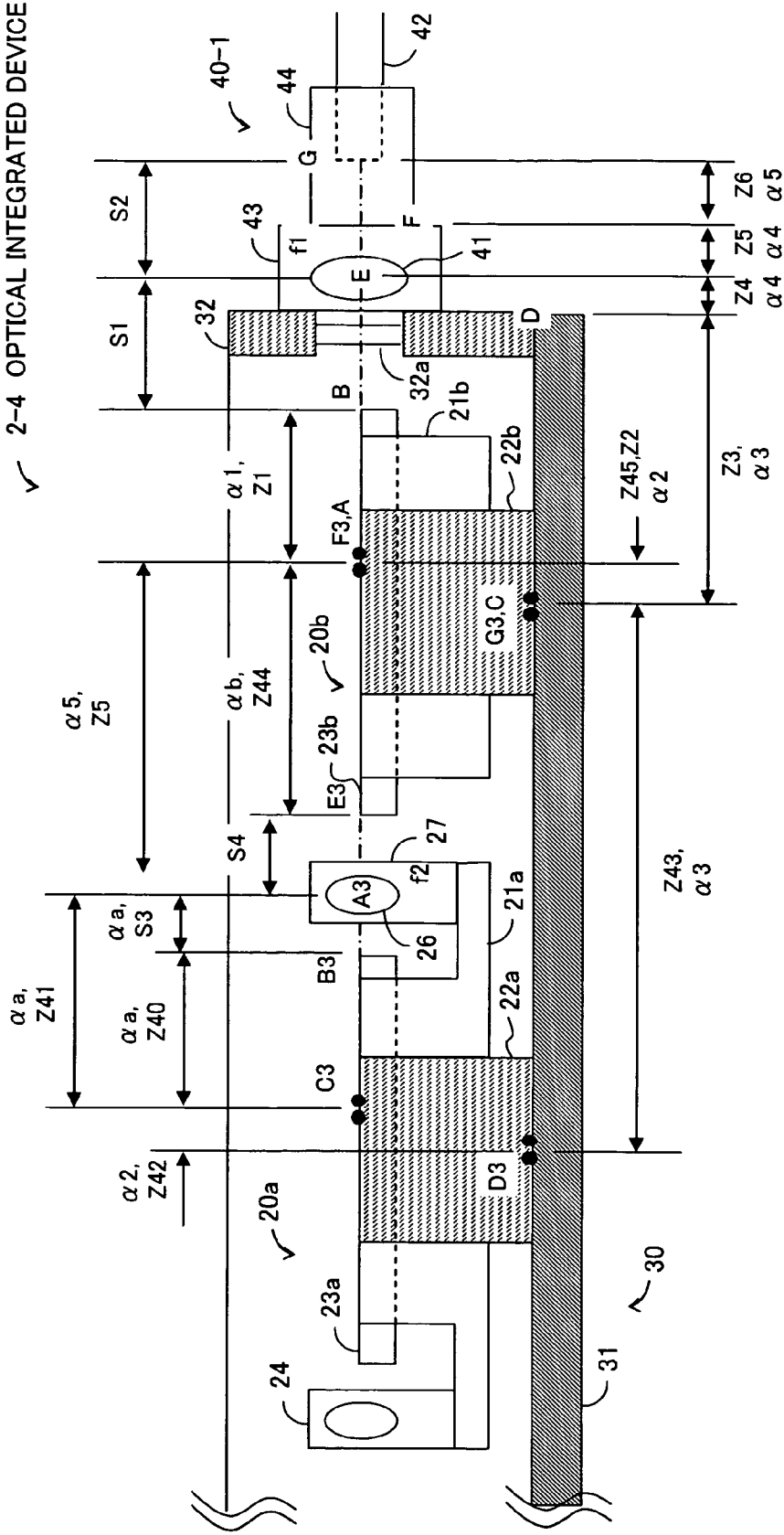
FIG. 21 shows the structure of an optical integrated device according to a fourth embodiment of the present invention.

An optical integrated device according to a fourth embodiment of the present invention will now be described. FIG. 21 shows the structure of an optical integrated device according to a fourth embodiment of the present invention. An optical integrated device 2-4 according to a fourth embodiment of the present invention comprises an optical element unit, a first optical waveguide unit (optical waveguide unit 20a), a second optical waveguide unit (optical waveguide unit 20b), a package 30, and an optical fiber unit 40-1. The optical element unit is the same as the optical element unit 10 included in the optical integrated device 2-1 according to the first embodiment of the present invention and is not shown.

The optical integrated device 2-4 according to the fourth embodiment of the present invention has the two optical waveguide units 20a and 20b in the package 30. The optical waveguide unit 20-2 in the second embodiment of the present invention is used as the optical waveguide unit 20a.

First through seventh holders correspond to holders 21a, 22a, 27, 21b, 22b, 43, and 44 respectively.

In the optical waveguide unit 20a, an optical waveguide chip 23a (hereinafter the optical waveguide chip 23a will also be referred to as an InP optical waveguide element 23a) is an optical waveguide element formed by using an InP substrate (the thermal expansion coefficient of which is 4.5×10$^{-6}$ (/° C.)). The thermal expansion coefficient of the holder 21a is approximately equal to that of the InP optical waveguide element 23a. For example, Kovar (the thermal expansion coefficient of which is 5.3×10$^{-6}$ (/° C.)) is used for forming the holder 21a. The entire reverse except areas near input and output ends of the InP optical waveguide element 23a is fixed to the holder 21a with, for example, an epoxy adhesive.

The holder 22a has the shape of the letter "U". The width of the holder 22a is set so that it will rub against the sides of the holder 21a. The holder 21a is fixed to the holder 22a at local areas at a level approximately equal to that of an optical waveguide in the InP optical waveguide element 23a by, for example, laser spot welding. In this case, the level of the holder 22a is set so that the bottom of the holder 21a will not touch another part and so that the holder 21a will be kept in a state in which it is floating in the air.

The lens 26 is supported by the holder 27. After optical axis alignment is performed so that the optical waveguide (InP) in the optical waveguide unit 20a will connect optically with an optical waveguide (LN) in the optical waveguide unit 20b, the lens 26 is fixed onto the holder 21a.

The holder 27 is made from Kovar that is used for making the holder 21a to make their thermal expansion coefficients equal. The lens 26 is fixed to the holder 27 at a level approximately equal to that of the optical axis by, for example, laser spot welding. A photoelectric conversion element (not shown) can be connected optically to the LN optical waveguide by adopting the same structure that is shown in FIG. 3.

The modifications shown in FIGS. 4 through 11 may be used as the structure of the holder 22a, a method for determining the positions of the holders 21a and 22a, and a method for fixing the holder 22a onto the inner bottom of the package.

In the optical waveguide unit 20b, an optical waveguide chip 23b (hereinafter the optical waveguide chip 23b will also be referred to as an LN optical modulation element 23b) is an optical modulation element formed by using an LN substrate (the thermal expansion coefficient of which is 16.7×10$^{-6}$ (/° C.)). The thermal expansion coefficient of the holder 21b is approximately equal to that of the LN optical modulation element 23b. For example, SUS304 (the thermal expansion coefficient of which is 17.3×10$^{-6}$ (/° C.)) is used for forming the holder 21b.

The entire reverse except areas near input and output ends of the LN optical modulation element 23b is fixed to the holder 21b with, for example, an epoxy adhesive. The holder 22b has the shape of the letter "U". The width of the holder 22b is set so that it will rub against the sides of the holder 21b. The holder 21b is fixed to the holder 22b at local areas at a level approximately equal to that of the optical waveguide in the LN optical modulation element 23b by, for example, laser spot welding. In this case, the level of the holder 22b is set so that the bottom of the holder 21b will not touch another part and so that the holder 21b will be kept in a state in which it is floating in the air.

The modifications shown in FIGS. 4 through 11 may be used as the structure of the holder 22b, a method for determining the positions of the holders 21b and 22b, and a method for fixing the holder 22b onto the inner bottom of the package.

In the optical fiber unit 40-1, a lens 41 and an optical fiber 42 are supported by the holders 43 and 44 respectively. After the optical axes of the lens 41 and the optical fiber 42 are aligned with those of the optical waveguides, the lens 41 and the optical fiber 42 are fixed to an opening 32a made in a sidewall portion 32 of the package 30 (by, for example, laser spot welding). (The lens 41 and the optical fiber 42 are fixed at a level approximately equal to that of the optical axis.)

The package 30 has a bottom portion 31 and the sidewall portion 32 which are made from different materials. The bottom portion 31 is made from CuW-20 (Cu20/W80) having high heat conductivity. The same material is used for making the sidewall portion 32 and the holders 22a and 22b to make their thermal expansion coefficients equal. In this case, Kovar is used. The bottom portion 31 and the sidewall portion 32 are brazed with, for example, a brazing metal.

As stated above, in the optical integrated device 2-4, a thermoelectric cooler (TEC) (not shown) is mounted on the bottom portion 31 made from CuW having high heat conductivity, so heat dissipativity can be ensured. The thermal expansion coefficient of the LN optical modulation element 23b is $16.7 \times 10^{-6}$ (/° C.), the thermal expansion coefficient of the InP optical waveguide element 23a is $4.5 \times 10^{-6}$ (/° C.), and the thermal expansion coefficient of the bottom portion 31 (CuW) of the package 30 is $8.1 \times 10^{-6}$ (/° C.). There is a difference in thermal expansion coefficient among them. However, an excessive stress or a crack due to thermal expansion mismatching can be avoided by local fixing.

The thermal expansion coefficient of the material for the InP optical waveguide element 23a is approximately equal to that of a material for the holders 21a and 27. Accordingly, even if expansion/contraction occurs due to thermal expansion, the relative positions in the direction of level of the InP optical waveguide and the lens 26 hardly change. As a result, a deviation in optical axis between them caused by a change in temperature can be avoided. In addition, the supports of the InP optical waveguide element 23a, the LN optical modulation element 23b, the lens 41, and the optical fiber 42 are made from the same material (Kovar). Therefore, expansion/contraction due to thermal expansion results in the same slight upward/downward movement. As a result, a deviation in optical axis caused by a change in temperature can be avoided.

That is to say, expansion/contraction due to thermal expansion results in the same slight upward/downward movement of the optical axes of the InP optical waveguide, the lens 26, the LN optical waveguide, the lens 41, and the optical fiber 42. As a result, a deviation in optical axis caused by a change in temperature can be avoided.

A detailed design for the optical integrated device 2-4 will now be described. Symbols that represent the length of each part and the position of each fixing point, being parameters, are as follows.

The focal length of the lens 41 is f1. The distance in the direction of the optical axis between a point A where the holder 21b is fixed to the holder 22b and a point B that indicates the position of an end of the optical waveguide chip 23b which optically connects with the lens 41 is Z1.

The distance in the direction of the optical axis between the point A and a point C where the holder 22b is fixed onto the bottom portion 31 is Z2. The distance in the direction of the optical axis between the point C and a point D that indicates the position of the sidewall portion 32 where the lens 41 is fixed is Z3.

The distance in the direction of the optical axis between the point D and a point E that indicates the center of support the holder 43 gives to the lens 41 is Z4. The distance in the direction of the optical axis between the point E and a point F where the holder 44 is fixed to the holder 43 is Z5. The distance in the direction of the optical axis between the point F and a point G that indicates a position where the end of the optical fiber 42 is supported by the holder 44 is Z6.

The distance in the direction of the optical axis between the points B and E is S1. The distance in the direction of the optical axis between the points E and G is S2. The thermal expansion coefficients of the optical waveguide chip 23b, the holder 22b, the bottom portion 31, the holder 43, and the holder 44 are α1, α2, α3, α4, and α5 respectively. S1 and S2 at a reference temperature are S10 and S20 respectively. The amount of a temperature change from the reference temperature is ΔT.

The length of the InP optical waveguide element 23a is 10 mm and the length of LN optical modulation element 23b is 44.5 mm. The focal length f1 of the lens 41 is 4 mm and the focal length f2 of the lens 26 is 1 mm. With the coupling of the LN optical waveguide, the lens 41, and the optical fiber 42, the spot size of the LN optical modulation element 23b is about 4 μm and the spot size of the optical fiber 42 is about 4.5 μm. Accordingly, the beam magnification of a coupling system including the lens 26 is set to one. The distance S1 between the end of the LN optical modulation element 23b and the principal point of the lens 41 is set to 8 mm and the distance S2 between the principal point of the lens 41 and the end of the optical fiber 42 is set to 8 mm. FIG. 22 shows the concrete numerical values of parameters. In FIG. 22, sections, materials used in the sections, the thermal expansion coefficients of the materials, and distances in the direction of the optical axis are shown (these numerical values are determined with consideration for conditional expressions (3a) through (3c) in the first embodiment).

If a material for each part, the length of each part, and the position of each fixing point are set in the this way, then a lens coupling formula is given by expression (3a) and the thermal expansion/contraction values of S1 and S2 can be calculated by expressions (3b) and (3c) respectively. When the point A is on the side of the point B with the point C as a reference, the value of Z2 is positive. When the point A is on the opposite side of the point B with the point C as a reference, the value of Z2 is negative.

Figure 23:
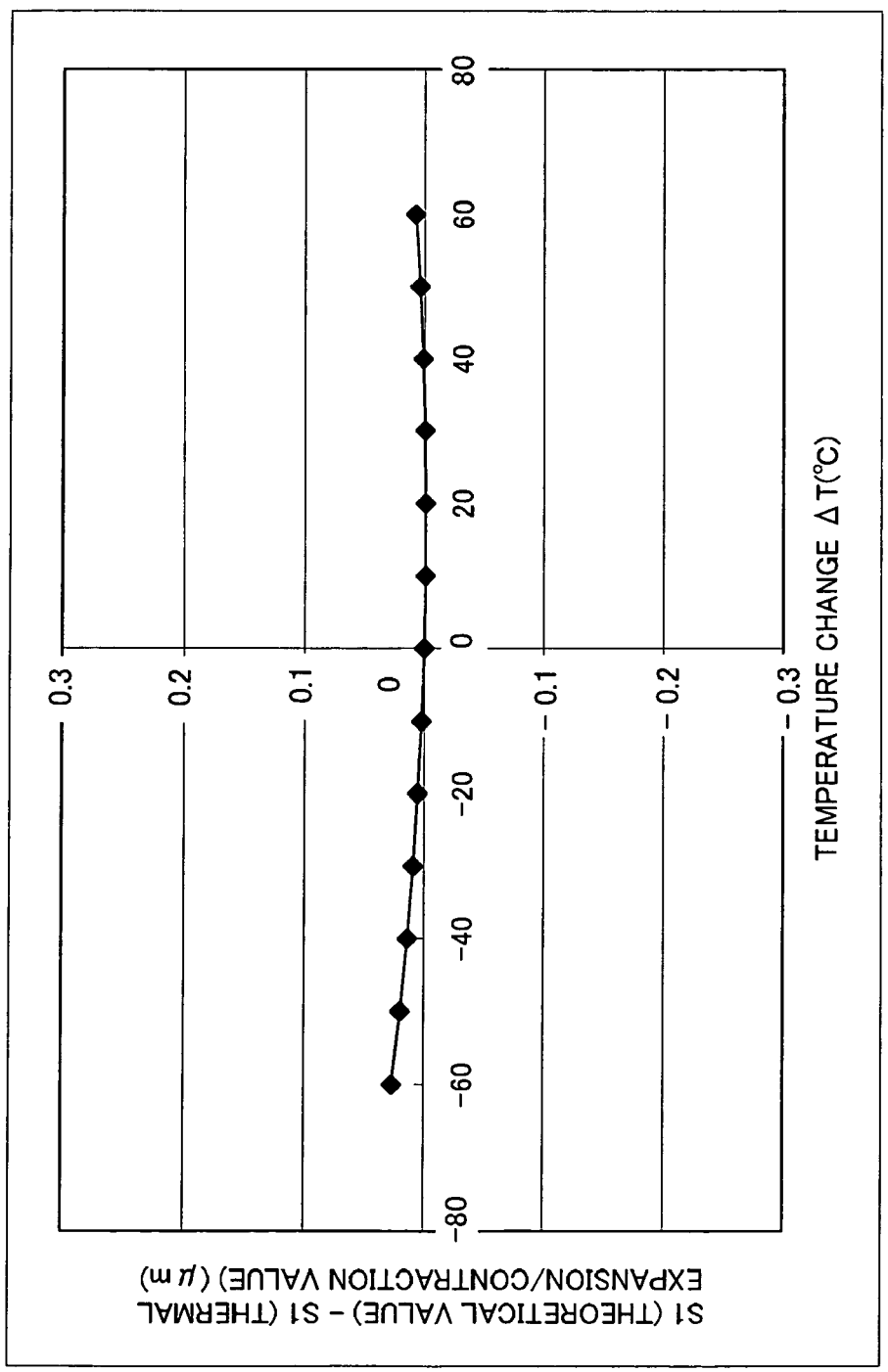
FIG. 23 shows the difference between theoretical values and experimental values in thermal expansion/contraction.

FIG. 23 shows the difference between theoretical values and experimental values in thermal expansion/contraction. In FIG. 23, a horizontal axis indicates temperature changes and a vertical axis indicates the difference between theoretical values and experimental values in thermal expansion/contraction. In a reference temperature range of from −60° C. to +60° C., S1 (theoretical value) that satisfies lens coupling expression (3a) is found by using S2 (thermal expansion/contraction value) calculated by expression (3c). In addition, S1 (thermal expansion/contraction value) is calculated by expression (3b). A graph shown in FIG. 23 is obtained by calculating (S1 (theoretical value)−S1 (thermal expansion/contraction value)).

The results obtained indicate that if the numerical values shown in FIG. 22 are used, S1 (thermal expansion/contraction value) is approximately equal to a theoretical value with an error smaller than or equal to 0.03 μm. That is to say, the distance in the direction of the optical axis between the LN optical waveguide and the lens 41 and the distance in the direction of the optical axis between the lens 41 and the optical fiber 42 always satisfy lens coupling expression (3a) in a reference temperature range of from −60° C. to +60° C. Therefore, characteristic variations due to a change in temperature (variations in optical coupling characteristic due to variations in the direction of the optical axis) can be restrained.

On the other hand, with the coupling of the InP optical waveguide, the lens 26, and the LN optical waveguide, the focal length of the lens 26 is f2. The distance in the direction of the optical axis between a point A3 that indicates the center of support the holder 27 gives to the lens 26 and a point B3 that indicates the position of an end of the optical waveguide chip 23a which optically connects with the lens 26 is S3.

The distance in the direction of the optical axis between the point B3 and a point C3 where the holder 21a is fixed to the holder 22a is Z40. The distance in the direction of the optical axis between the points A3 and C3 is Z41. The distance in the direction of the optical axis between the point C3 and a point D3 where the holder 22a is fixed onto the bottom portion 31 of the package 30 is Z42.

The distance in the direction of the optical axis between a point E3 that indicates the position of an end of the optical waveguide chip 23b which optically connects with the lens 26 and a point F3 where the holder 21b is fixed to the holder 22b is Z44. The distance in the direction of the optical axis between the point F3 and a point G3 where the holder 22b is fixed onto the bottom portion 31 of the package 30 is Z45.

The distance in the direction of the optical axis between the points A3 and E3 is S4. The distance in the direction of the optical axis between the points D3 and G3 is Z43. The thermal expansion coefficients of the optical waveguide chip 23a and the holder 21a are αa. The thermal expansion coefficients of the holders 22a and 22b are α2. The thermal expansion coefficient of the bottom portion 31 of the package 30 is α3. The thermal expansion coefficients of the optical waveguide chip 23b and the holder 21b are αb. S3 and S4 at a reference temperature are S30 and S40 respectively. The amount of a temperature change from the reference temperature is ΔT.

The spot size of the InP optical waveguide element 23a is about 1 μm and the spot size of the LN optical modulation element 23b is about 4 μm. Accordingly, the beam magnification of a coupling system including the lens 26 is set to four. The distance S3 between the end of the InP optical waveguide element 23a and the principal point of the lens 26 is set to 1.25 mm and the distance S4 between the principal point of the lens 26 and the end of the LN optical modulation element 23b is set to 5 mm. FIG. 24 shows the concrete numerical values of parameters. In FIG. 24, sections, materials used in the sections, the thermal expansion coefficients of the materials, and distances in the direction of the optical axis are shown (these numerical values are determined with consideration for conditional expressions (6a) through (6c) described later).

If a material for each part, the length of each part, and the position of each fixing point are set in this way, then a lens coupling formula is given by expression (6a) and the thermal expansion/contraction values of S1 and S2 can be calculated by expressions (6b) and (6c) respectively. When the point C3 is on the side of the point B3 with the point D3 as a reference, the value of Z42 is positive. When the point C3 is on the opposite side of the point B3 with the point D3 as a reference, the value of Z42 is negative. When the point F3 is on the side of the point E3 with the point G3 as a reference, the value of Z45 is positive. When the point F3 is on the opposite side of the point E3 with the point G3 as a reference, the value of Z45 is negative.

$$\frac{1}{S3} + \frac{1}{S4} = \frac{1}{f2} \tag{6a}$$

$$S3 = S30 + \alpha a \times S3 \times \Delta T \tag{6b}$$

$$S4 = S40 + (\alpha 3 \times Z43 - \alpha a \times Z41 - \alpha 2 \times Z42 - \alpha b \times Z44 - \alpha 2 \times Z45) \times \Delta T \tag{6c}$$

Figure 25:
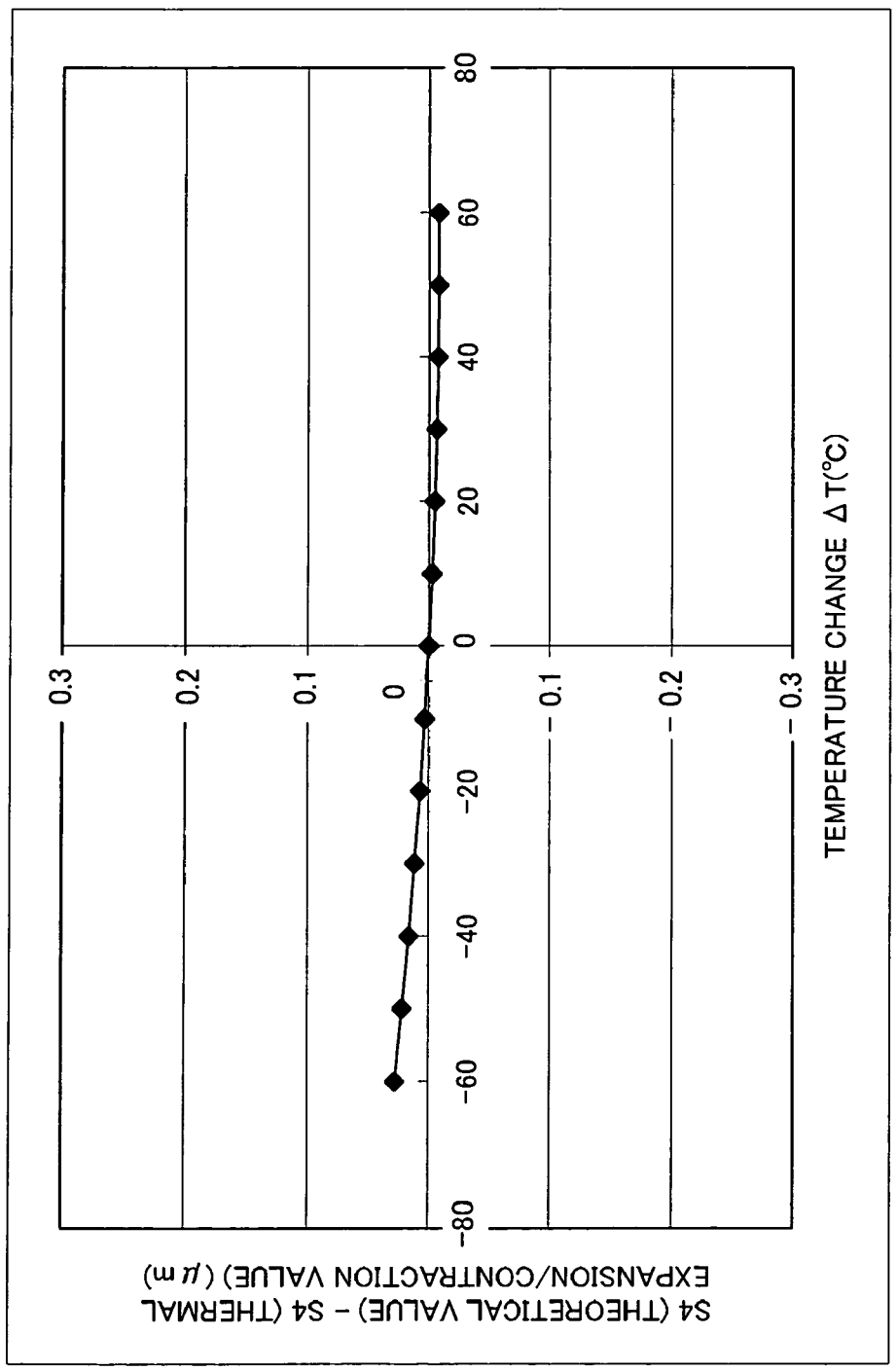
FIG. 25 shows the difference between theoretical values and experimental values in thermal expansion/contraction.

FIG. 25 shows the difference between theoretical values and experimental values in thermal expansion/contraction. In FIG. 25, a horizontal axis indicates temperature changes and a vertical axis indicates the difference between theoretical values and experimental values in thermal expansion/contraction. In a reference temperature range of from −60° C. to +60° C., S3 (theoretical value) that satisfies lens coupling expression (6a) is found by using S4 (thermal expansion/contraction value) calculated by expression (6c).

In addition, S3 (thermal expansion/contraction value) is calculated by expression (6b). A graph shown in FIG. 25 is obtained by calculating (S3 (theoretical value)−S3 (thermal expansion/contraction value)).

The results obtained indicate that if the numerical values shown in FIG. 24 are used, S3 (thermal expansion/contraction value) is approximately equal to a theoretical value with an error smaller than or equal to 0.03 μm. That is to say, the distance in the direction of the optical axis between the InP optical waveguide and the lens 26 and the distance in the direction of the optical axis between the lens 26 and the LN optical waveguide always satisfy lens coupling expression (6a) in a reference temperature range of from −60° C. to +60° C. Therefore, characteristic variations due to a change in temperature (variations in optical coupling characteristic due to variations in the direction of the optical axis) can be restrained.

Accordingly, even if there is a change in temperature, the distance in the direction of the optical axis between the LN optical waveguide and the lens 41 and the distance in the direction of the optical axis between the lens 41 and the optical fiber 42 in a coupling system including the LN optical waveguide, the lens 41, and the optical fiber 42 and the distance in the direction of the optical axis between the InP optical waveguide and the lens 26 and the distance in the direction of the optical axis between the lens 26 and the LN optical waveguide in a coupling system including the InP optical waveguide, the lens 26, and the LN optical waveguide always satisfy the lens coupling expression at the same time. As a result, characteristic variations due to a change in temperature (variations in optical coupling characteristic due to variations in the direction of the optical axis) can be restrained.

Figure 26:
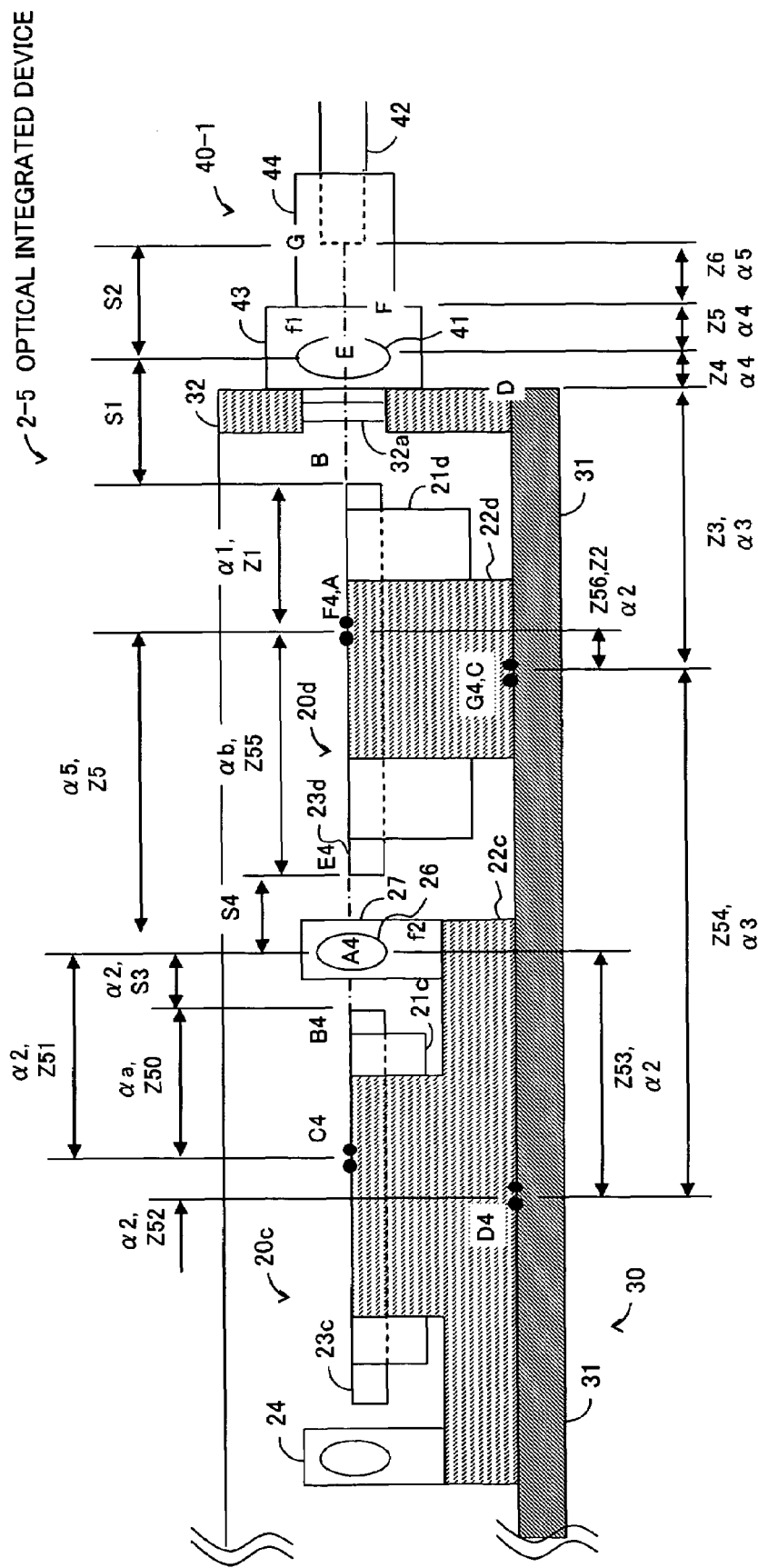
FIG. 26 shows the structure of an optical integrated device according to a fifth embodiment of the present invention.

An optical integrated device according to a fifth embodiment of the present invention will now be described. FIG. 26 shows the structure of an optical integrated device according to a fifth embodiment of the present invention. An optical integrated device 2-5 according to a fifth embodiment of the present invention comprises an optical element unit, a first optical waveguide unit (optical waveguide unit 20c), a second optical waveguide unit (optical waveguide unit 20d), a package 30, and an optical fiber unit 40-1. The optical element unit is the same as the optical element unit 10 included in the optical integrated device 2-1 according to the first embodiment of the present invention and is not shown.

The optical integrated device 2-5 according to the fifth embodiment of the present invention has the two optical waveguide units 20c and 20d in the package 30. The optical waveguide unit 20-3 in the third embodiment of the present invention is used as the optical waveguide unit 20c.

First through seventh holders correspond to holders 21c, 22c, 27, 21d, 22d, 43, and 44 respectively.

In the optical waveguide unit 20c, an optical waveguide chip 23c (hereinafter the optical waveguide chip 23c will also be referred to as an InP optical waveguide element 23c) is an optical waveguide element formed by using an InP substrate (the thermal expansion coefficient of which is 4.5×10$^{-6}$ (/° C.)). The thermal expansion coefficient of the holder 21c is approximately equal to that of the InP optical waveguide element 23c. For example, Kovar (the thermal expansion coefficient of which is 5.3×10$^{-6}$ (/° C.)) is used for forming the holder 21c. The entire reverse except areas near input and output ends of the InP optical waveguide element 23c is fixed to the holder 21c with, for example, an epoxy adhesive.

The holder 22c has the shape of the letter "U". The width of the holder 22c is set so that it will rub against the sides of the holder 21c. The holder 21c is fixed to the holder 22c at local areas at a level approximately equal to that of an optical waveguide in the InP optical waveguide element 23c by, for example, laser spot welding. In this case, the level of the holder 22c is set so that the bottom of the holder 21c will not touch another part and so that the holder 21c will be kept in a state in which it is floating in the air.

The lens 26 is supported by the holder 27. After optical axis alignment is performed so that the optical waveguide (InP) in the optical waveguide unit 20c will connect optically with an optical waveguide (LN) in the optical waveguide unit 20d, the lens 26 is fixed onto the holder 22c.

The holder 27 is made from Kovar that is used for making the holder 22c to make their thermal expansion coefficients equal. The lens 26 is fixed to the holder 27 at a level approximately equal to that of the optical axis by, for example, laser spot welding. A photoelectric conversion element (not shown) can be connected optically to the InP optical waveguide by adopting the same structure that is shown in FIG. 3.

The modifications shown in FIGS. 4 through 11 may be used as the structure of the holder 22c, a method for determining the positions of the holders 21c and 22c, and a method for fixing the holder 22c onto the inner bottom of the package.

In the optical waveguide unit 20d, an optical waveguide chip 23d (hereinafter the optical waveguide chip 23d will also be referred to as an LN optical modulation element 23d) is an optical modulation element formed by using an LN substrate (the thermal expansion coefficient of which is $16.7 \times 10^{-6}$ (/° C.)). The thermal expansion coefficient of the holder 21d is approximately equal to that of the LN optical modulation element 23d. For example, SUS304 (the thermal expansion coefficient of which is $17.3 \times 10^{-6}$ (/° C.)) is used for forming the holder 21d.

The entire reverse except areas near input and output ends of the LN optical modulation element 23d is fixed to the holder 21d with, for example, an epoxy adhesive. The holder 22d has the shape of the letter "U". The width of the holder 22d is set so that it will rub against the sides of the holder 21d. The holder 21d is fixed to the holder 22d at local areas at a level approximately equal to that of the optical waveguide in the LN optical modulation element 23d by, for example, laser spot welding. In this case, the level of the holder 22d is set so that the bottom of the holder 21d will not touch another part and so that the holder 21d will be kept in a state in which it is floating in the air.

The modifications shown in FIGS. 4 through 11 may be used as the structure of the holder 22d, a method for determining the positions of the holders 21d and 22d, and a method for fixing the holder 22d onto the inner bottom of the package.

In the optical fiber unit 40-1, a lens 41 and an optical fiber 42 are supported by the holders 43 and 44 respectively. After the optical axes of the lens 41 and the optical fiber 42 are aligned with those of the optical waveguides, the lens 41 and the optical fiber 42 are fixed to an opening 32a made in a sidewall portion 32 of the package 30 (by, for example, laser spot welding). (The lens 41 and the optical fiber 42 are fixed at a level approximately equal to that of the optical axis.)

The package 30 has a bottom portion 31 and the sidewall portion 32 which are made from different materials. The bottom portion 31 is made from CuW-20 (Cu20/W80) having high heat conductivity. The same material is used for making the sidewall portion 32 and the holders 22c and 22d to make their thermal expansion coefficients equal. In this case, Kovar is used. The bottom portion 31 and the sidewall portion 32 are brazed with, for example, a brazing metal.

As stated above, in the optical integrated device 2-5, a TEC (not shown) is mounted on the bottom portion 31 made from CuW having high heat conductivity, so heat dissipativity can be ensured. The thermal expansion coefficient of the LN optical modulation element 23d is $16.7 \times 10^{-6}$ (/° C.), the thermal expansion coefficient of the InP optical waveguide element 23c is $4.5 \times 10^{-6}$ (/° C.), and the thermal expansion coefficient of the bottom portion 31 (CuW) of the package 30 is $8.1 \times 10^{-6}$ (/° C.). There is a difference in thermal expansion coefficient among them. However, an excessive stress or a crack due to thermal expansion mismatching can be avoided by local fixing.

The holders 22c and 27 are made from the same material, so their thermal expansion coefficients are equal. Therefore, expansion/contraction due to thermal expansion results in the same slight upward/downward movement of the InP optical waveguide and the lens 26. As a result, a deviation in optical axis caused by a change in temperature can be avoided.

In addition, the supports of the InP optical waveguide element 23c, the LN optical modulation element 23d, the lens 41, and the optical fiber 42 are made from the same material (Kovar). Therefore, expansion/contraction due to thermal expansion results in the same slight upward/downward movement. As a result, a deviation in optical axis caused by a change in temperature can be avoided.

That is to say, expansion/contraction due to thermal expansion results in the same slight upward/downward movement of the optical axes of the InP optical waveguide, the lens 26, the LN optical waveguide, the lens 41, and the optical fiber 42. As a result, a deviation in optical axis caused by a change in temperature can be avoided.

A detailed design for the optical integrated device 2-5 will now be described. Symbols that represent the length of each part and the position of each fixing point, being parameters, are as follows.

The focal length of the lens 41 is f1. The distance in the direction of the optical axis between a point A where the holder 21d is fixed to the holder 22d and a point B that indicates the position of an end of the optical waveguide chip 23d which optically connects with the lens 41 is Z1.

The distance in the direction of the optical axis between the point A and a point C where the holder 22d is fixed onto the bottom portion 31 is Z2. The distance in the direction of the optical axis between the point C and a point D that indicates the position of the sidewall portion 32 where the lens 41 is fixed is Z3.

The distance in the direction of the optical axis between the point D and a point E that indicates the center of support the holder 43 gives to the lens 41 is Z4. The distance in the direction of the optical axis between the point E and a point F where the holder 44 is fixed to the holder 43 is Z5. The distance in the direction of the optical axis between the point F and a point G that indicates a position where the end of the optical fiber 42 is supported by the holder 44 is Z6.

The distance in the direction of the optical axis between the points B and E is S1. The distance in the direction of the optical axis between the points E and G is S2. The thermal expansion coefficients of the optical waveguide chip 23d, the holder 22d, the bottom portion 31, the holder 43, and the holder 44 are α1, α2, α3, α4, and α5 respectively. S1 and S2 at a reference temperature are S10 and S20 respectively. The amount of a temperature change from the reference temperature is ΔT.

The length of the InP optical waveguide element 23c is 10 mm and the length of LN optical modulation element 23d is 50 mm. The focal length f1 of the lens 41 is 4 mm and the focal length f2 of the lens 26 is 1 mm.

With the coupling of the LN optical waveguide, the lens 41, and the optical fiber 42, the spot size of the LN optical modulation element 23d is about 4 μm and the spot size of the optical fiber 42 is about 4.5 μm. Accordingly, the beam magnification of a coupling system including the lens 41 is set to one. The distance S1 between the end of the LN optical modulation element 23d and the principal point of the lens 41 is set to 8 mm and the distance S2 between the principal point of the lens 41 and the end of the optical fiber 42 is set to 8 mm. FIG. 27 shows the concrete numerical values of parameters. In FIG. 27, sections, materials used in the sections, the thermal expansion coefficients of the materials, and distances in the direction of the optical axis are shown (these numerical values are determined with consideration for conditional expressions (3a) through (3c) in the first embodiment).

If a material for each part, the length of each part, and the position of each fixing point are set in the this way, then a lens coupling formula is given by expression (3a) and the thermal expansion/contraction values of S1 and S2 can be calculated by expressions (3b) and (3c) respectively.

Figure 28:
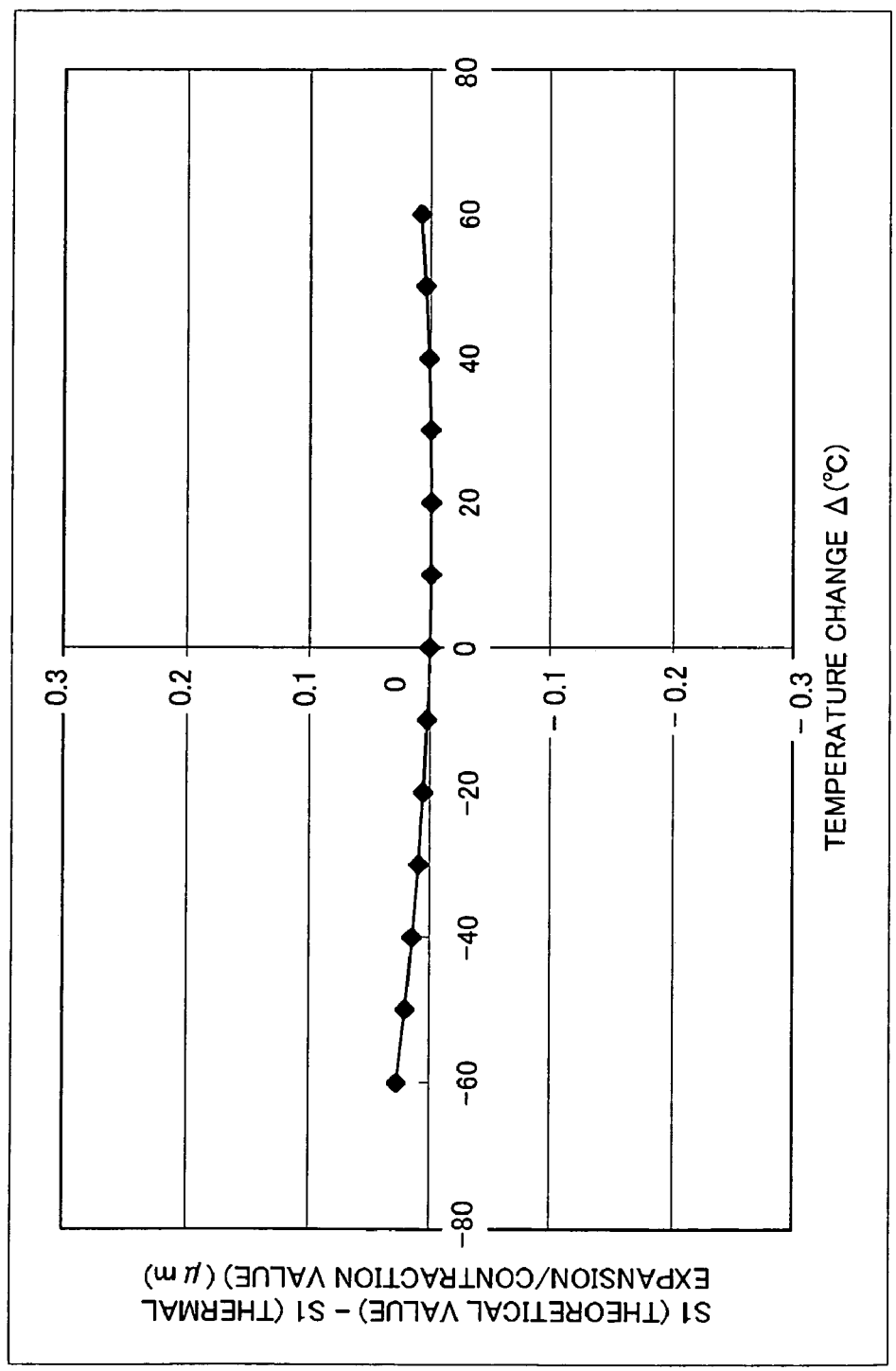
FIG. 28 shows the difference between theoretical values and experimental values in thermal expansion/contraction.

FIG. 28 shows the difference between theoretical values and experimental values in thermal expansion/contraction. In FIG. 28, a horizontal axis indicates temperature changes and a vertical axis indicates the difference between theoretical values and experimental values in thermal expansion/contraction. In a reference temperature range of from −60° C. to +60° C., S1 (theoretical value) that satisfies lens coupling expression (3a) is found by using S2 (thermal expansion/contraction value) calculated by expression (3c). In addition, S1 (thermal expansion/contraction value) is calculated by expression (3b). A graph shown in FIG. 28 is obtained by calculating (S1 (theoretical value)−S1 (thermal expansion/contraction value)).

The results obtained indicate that if the numerical values shown in FIG. 27 are used, S1 (thermal expansion/contraction value) is approximately equal to a theoretical value with an error smaller than or equal to 0.03 μm. That is to say, the distance in the direction of the optical axis between the LN optical waveguide and the lens 41 and the distance in the direction of the optical axis between the lens 41 and the optical fiber 42 always satisfy lens coupling expression (3a) in a reference temperature range of from −60° C. to +60° C. Therefore, characteristic variations due to a change in temperature (variations in optical coupling characteristic due to variations in the direction of the optical axis) can be restrained.

On the other hand, with the coupling of the InP optical waveguide, the lens 26, and the LN optical waveguide, the focal length of the lens 26 is f2. The distance in the direction of the optical axis between a point A4 that indicates the center of support the holder 27 gives to the lens 26 and a point B4 that indicates the position of an end of the optical waveguide chip 23c which optically connects with the lens 26 is S3.

The distance in the direction of the optical axis between the point B4 and a point C4 where the holder 21c is fixed to the holder 22c is Z50. The distance in the direction of the optical axis between the points A4 and C4 is Z51. The distance in the direction of the optical axis between the point C4 and a point D4 where the holder 22c is fixed onto the bottom portion 31 of the package 30 is Z52.

The distance in the direction of the optical axis between a point E4 that indicates the position of an end of the optical waveguide chip 23d which optically connects with the lens 26 and a point F4 where the holder 21d is fixed to the holder 22d is Z55. The distance in the direction of the optical axis between the point F4 and a point G4 where the holder 22d is fixed onto the bottom portion 31 of the package 30 is Z56.

The distance in the direction of the optical axis between the points A4 and E4 is S4. The distance in the direction of the optical axis between the points D4 and G4 is Z54. The thermal expansion coefficients of the optical waveguide chip 23c and the holder 21c are αa. The thermal expansion coefficients of the holders 22c and 22d are α2. The thermal expansion coefficient of the bottom portion 31 of the package 30 is α3. The thermal expansion coefficients of the optical waveguide chip 23d and the holder 21d are αb. S3 and S4 at a reference temperature are S30 and S40 respectively. The amount of a temperature change from the reference temperature is ΔT.

The spot size of the InP optical waveguide element 23c is about 1 μm and the spot size of the LN optical modulation element 23d is about 4 μm. Accordingly, the beam magnification of a coupling system including the lens 26 is set to four. The distance S3 between the end of the InP optical waveguide element 23c and the principal point of the lens 26 is set to 1.25 mm and the distance S4 between the principal point of the lens 26 and the end of the optical waveguide chip 23d is set to 5 mm. FIG. 29 shows the concrete numerical values of parameters. In FIG. 29, sections, materials used in the sections, the thermal expansion coefficients of the materials, and distances in the direction of the optical axis are shown (these numerical values are determined with consideration for conditional expressions (7a) through (7c) described later).

If a material for each part, the length of each part, and the position of each fixing point are set in this way, then a lens coupling formula is given by expression (7a) and the thermal expansion/contraction values of S1 and S2 can be calculated by expressions (7b) and (7c) respectively. When the point C4 is on the side of the point B4 with the point D4 as a reference, the value of Z52 is positive. When the point C4 is on the opposite side of the point B4 with the point D4 as a reference, the value of Z52 is negative. When the point F4 is on the side of the point E4 with the point G4 as a reference, the value of Z56 is positive. When the point F4 is on the opposite side of the point E4 with the point G4 as a reference, the value of Z56 is negative.

$$\frac{1}{S3} + \frac{1}{S4} = \frac{1}{f2} \tag{7a}$$

$$S3 = S30 + (\alpha 2 \times Z51 - \alpha a \times Z50) \times \Delta T \tag{7b}$$

$$S4 = S40 + (\alpha 3 \times Z54 - \alpha 2 \times Z53 - \alpha 2 \times Z56 - \alpha b \times Z55) \times \Delta T \tag{7c}$$

Figure 30:
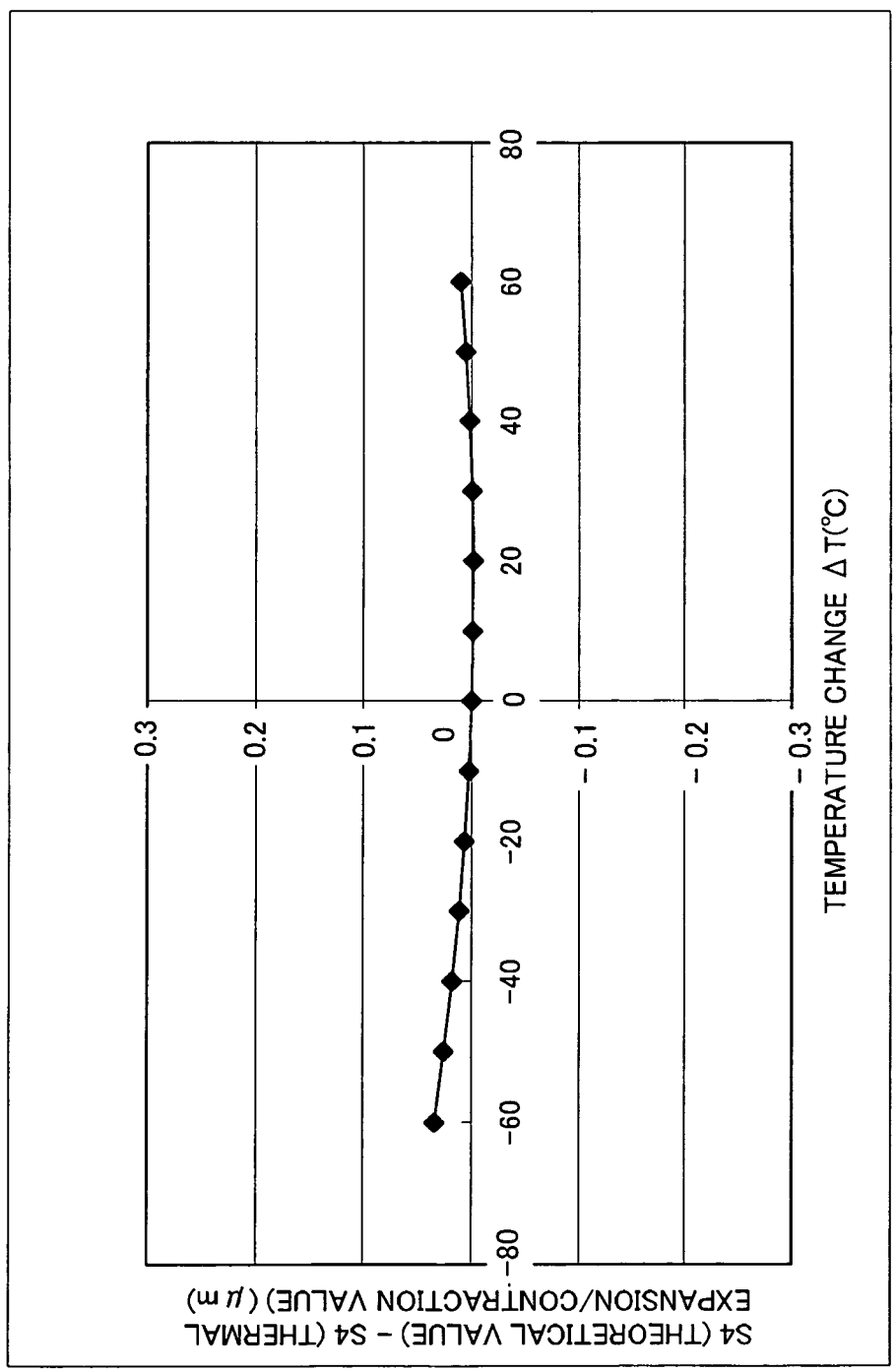
FIG. 30 shows the difference between theoretical values and experimental values in thermal expansion/contraction.
Figure 31:
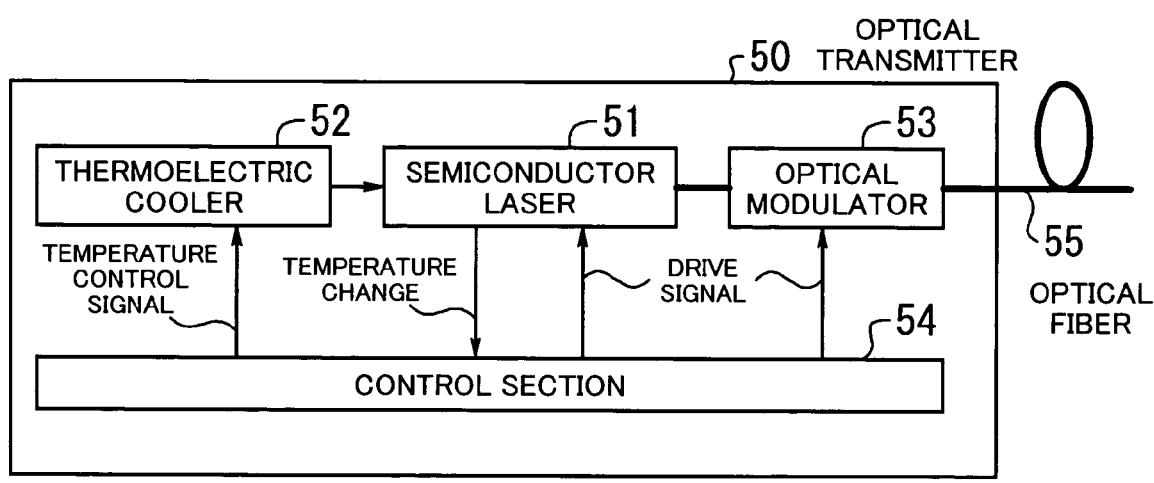
FIG. 31 shows the rough structure of an optical transmitter used for WDM transmission.
Figure 32:
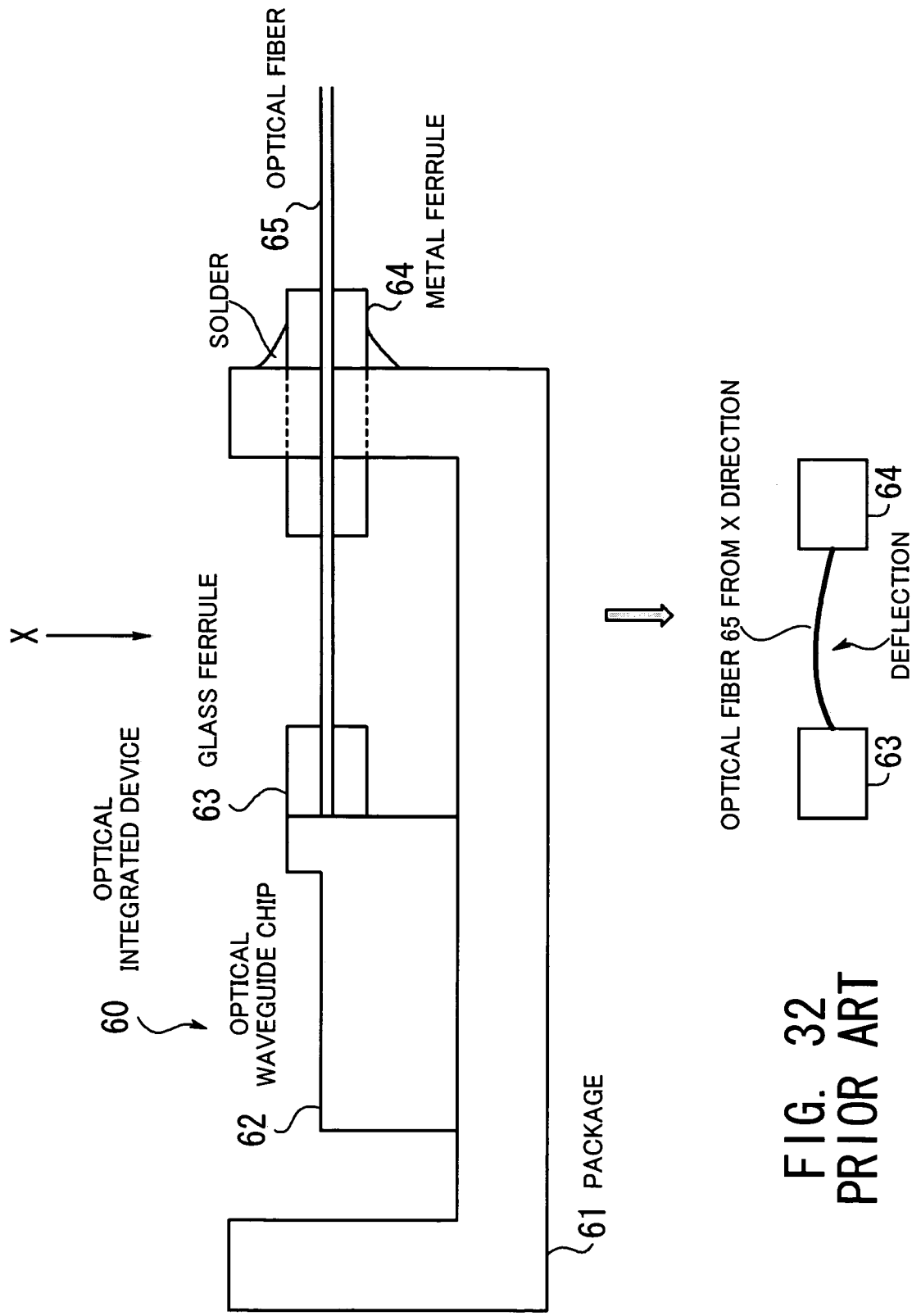
FIG. 32 shows the structure of a conventional optical integrated device.

FIG. 30 shows the difference between theoretical values and experimental values in thermal expansion/contraction. In FIG. 30, a horizontal axis indicates temperature changes and a vertical axis indicates the difference between theoretical values and experimental values in thermal expansion/contraction. In a reference temperature range of from −60° C. to +60° C., S3 (theoretical value) that satisfies lens coupling expression (7a) is found by using S4 (thermal expansion/contraction value) calculated by expression (7c). In addition, S3 (thermal expansion/contraction value) is calculated by expression (7b). A graph shown in FIG. 30 is obtained by calculating (S3 (theoretical value)−S3 (thermal expansion/contraction value)).

The results obtained indicate that if the numerical values shown in FIG. 29 are used, S3 (thermal expansion/contraction value) is approximately equal to a theoretical value with an error smaller than or equal to 0.03 μm. That is to say, the distance in the direction of the optical axis between the InP optical waveguide and the lens 26 and the distance in the direction of the optical axis between the lens 26 and the LN optical waveguide always satisfy lens coupling expression (7a) in a reference temperature range of from −60° C. to +60° C. Therefore, characteristic variations due to a change in temperature (variations in optical coupling characteristic due to variations in the direction of the optical axis) can be restrained.

Accordingly, even if there is a change in temperature, the distance in the direction of the optical axis between the LN optical waveguide and the lens 41 and the distance in the direction of the optical axis between the lens 41 and the optical fiber 42 in a coupling system including the LN optical waveguide, the lens 41, and the optical fiber 42 and the distance in the direction of the optical axis between the InP optical waveguide and the lens 26 and the distance in the direction of the optical axis between the lens 26 and the LN optical waveguide in a coupling system including the InP optical waveguide, the lens 26, and the LN optical waveguide always satisfy the lens coupling expression at the same time. As a result, characteristic variations due to a change in temperature (variations in optical coupling characteristic due to variations in the direction of the optical axis) can be restrained.

As has been described in the foregoing, with the optical integrated devices 2-1 through 2-5, heat dissipativity can be ensured, application of an excessive stress or the appearance of a crack due to thermal expansion mismatching can be avoided, and characteristic variations (deviation in optical axis) due to a change in temperature or an external factor, such as vibration or shock, can be avoided. In addition, the present invention contributes greatly to the miniaturization of, a reduction in the manufacturing costs of, and the improvement of the functions of optical devices.

With the optical integrated devices according to the present invention, the optical fiber without deflection is contained in the package by making the amount of expansion/contraction which occurs due to the thermal expansion of the package and the thermal expansion of the pipe fixed around the opening made in the package match the amount of expansion/contraction which occurs due to the thermal expansion of the optical fiber and the thermal expansion of the ferrule inserted into the pipe and fixed to the end of the pipe. As a result, application of an excessive stress or the appearance of a crack due to thermal expansion mismatching can be prevented and assembly can be simplified.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An optical integrated device in which optical parts are contained in a same package, the device comprising:
   an optical waveguide chip for modulating optical signals;
   an optical fiber;
   a first ferrule which is fixed to the optical waveguide chip and into which the optical fiber is inserted for fixing the optical fiber;
   the package which contains the optical waveguide chip and the first ferrule and in a sidewall of which an opening is made for pulling out the optical fiber to the outside;
   a pipe airtightly fixed around the opening; and
   a second ferrule which is inserted into the pipe for airtightly fixing the second ferrule to an end of the pipe and into which the optical fiber pulled out to the outside of the package through the opening is inserted for fixing the optical fiber,
   wherein the optical fiber without deflection is contained in the package by making a first expansion/contraction amount created due to the thermal expansion of the package and the thermal expansion of the pipe match a second expansion/contraction amount created due to the thermal expansion of the optical fiber and the thermal expansion of the second ferrule
   and wherein a state of the optical fiber without deflection is always maintained in the package at an environmental temperature where the optical integrated device is used.

2. The optical integrated device according to claim 1, wherein the first expansion/contraction amount $\Delta L1$ calculated by $$\Delta L1 = \alpha 1 \times a \times \Delta T + \alpha 2 \times b \times \Delta T \tag{1}$$

is approximately equal to the second expansion/contraction amount $\Delta L2$ calculated by $$\Delta L2 = \alpha 3 \times c \times \Delta T + \alpha 4 \times d \times \Delta T \tag{2}$$

where, in equations (1) and (2), a is the distance between a point P1 where the optical fiber is fixed to the optical waveguide chip and an outer surface of the sidewall of the package, b is the distance between the outer surface of the sidewall of the package and a point P2 where the second ferrule is fixed to the pipe, c is the distance between the point P1 and a point P3 where the optical fiber and the second ferrule connect, d is the distance between the points P3 and P2, $\alpha 1$ is the thermal expansion coefficient of the package, $\alpha 2$ is the thermal expansion coefficient of the pipe, $\alpha 3$ is the thermal expansion coefficient of the optical fiber, $\alpha 4$ is the thermal expansion coefficient of the second ferrule, $\Delta T$ is a temperature difference at the time of fabricating the device.

3. An optical integrated device in which optical parts are contained in a same package, the device comprising:
   an optical element unit including:
   a photoelectric conversion element for converting electrical signals into optical signals, and
   a thermoelectric cooler for controlling the temperature of the photoelectric conversion element,
   the photoelectric conversion element being mounted on the thermoelectric cooler via a subcarrier;
   an optical waveguide unit including:
   an optical waveguide chip for modulating the optical signals outputted from the photoelectric conversion element,
   a first holder on which the optical waveguide chip is mounted and which has a thermal expansion coefficient approximately equal to the thermal expansion coefficient of the optical waveguide chip, and
   a second holder which supports the first holder by the sides and to which the first holder is fixed at local areas at a level equal to the level of an optical waveguide on the optical waveguide chip so that the bottom of the first holder will not touch another part and so that the first holder will be kept in a state in which the first holder is floating in the air;

the package including:

a bottom portion onto an inner bottom of which the second holder is fixed at local areas, onto the inner bottom of which the thermoelectric cooler is fixed, and which is formed by using a material having high heat conductivity, and a sidewall portion which has a thermal expansion coefficient approximately equal to the thermal expansion coefficient of the second holder and in which an opening is made; and an optical fiber unit including:

a lens, an optical fiber, a third holder for supporting the lens, and a fourth holder for supporting the optical fiber and fixing the optical fiber to the third holder, wherein:

the lens is fixed to an outer surface of the sidewall portion via the third holder; and the optical fiber unit optically connects with the optical waveguide chip through the opening.

4. The optical integrated device according to claim 3, wherein the following equations are satisfied:

$$\frac{1}{S1} + \frac{1}{S2} = \frac{1}{f1} \quad (3a)$$

$$S1 = S10 + (\alpha3 \times Z3 + \alpha4 \times Z4 - \alpha1 \times Z1 - \alpha2 \times Z2) \times \Delta T \quad (3b)$$

$$S2 = S20 + (\alpha4 \times Z5 + \alpha5 \times Z6) \times \Delta T \quad (3c)$$

where f1 is the focal length of the lens, Z1 is the distance in the direction of an optical axis between a point A where the first holder is fixed to the second holder and a point B that indicates the position of an end of the optical waveguide chip which optically connects with the lens, Z2 is the distance in the direction of the optical axis between the point A and a point C where the second holder is fixed to the bottom portion, Z3 is the distance in the direction of the optical axis between the point C and a point D that indicates the position of the sidewall portion where the lens is fixed, Z4 is the distance in the direction of the optical axis between the point D and a point E that indicates the center of support the third holder gives to the lens, Z5 is the distance in the direction of the optical axis between the point E and a point F where the fourth holder is fixed to the third holder, Z6 is the distance in the direction of the optical axis between the point F and a point G that indicates a position where an end of the optical fiber is supported by the fourth holder, S1 is the distance in the direction of the optical axis between the points B and E, S2 is the distance in the direction of the optical axis between the points E and G, $\alpha1$, $\alpha2$, $\alpha3$, $\alpha4$, and $\alpha5$ are the thermal expansion coefficients of the optical waveguide chip, the second holder, the bottom portion, the third holder, and the fourth holder 44 respectively, S10 and S20 are S1 and S2, respectively, at a reference temperature, and $\Delta T$ is the amount of a temperature change from the reference temperature, the value of Z2 being positive when the point A is on the side of the point B with the point C as a reference and being negative when the point A is on the opposite side of the point B with the point C as a reference.

5. The optical integrated device according to claim 3, wherein:

the first holder has concave portions;

the second holder has convex portions;

the first holder has projections at positions indicative of the level of the optical waveguide which the second holder strikes when the second holder is fitted into the first holder;

the second holder is fitted into the first holder by sliding the first holder and the second holder in the direction of level; and the first holder is fixed to the second holder at local areas on the projections.

6. The optical integrated device according to claim 3, wherein concave portions are formed in an area on the inner bottom of the package where the second holder is to be mounted to narrow an area where the package and the second holder touch.

7. An optical integrated device in which optical parts are contained in a same package, the device comprising:

an optical element unit including:

a photoelectric conversion element for converting electrical signals into optical signals, and a thermoelectric cooler for controlling the temperature of the photoelectric conversion element, the photoelectric conversion element being mounted on the thermoelectric cooler via a subcarrier;

an optical waveguide unit including:

an optical waveguide chip for modulating the optical signals outputted from the photoelectric conversion element, a first holder on which the optical waveguide chip is mounted and which has a thermal expansion coefficient approximately equal to the thermal expansion coefficient of the optical waveguide chip, a second holder which supports the first holder by the sides and to which the first holder is fixed at local areas at a level equal to the level of an optical waveguide on the optical waveguide chip so that the bottom of the first holder will not touch another part and so that the first holder will be kept in a state in which the first holder is floating in the air, a lens, and a third holder which has a thermal expansion coefficient approximately equal to the thermal expansion coefficient of the second holder and by which the lens is fixed to the second holder so that the lens will be kept at the level of an optical axis;

the package including:

a bottom portion onto an inner bottom of which the second holder is fixed at local areas, onto the inner bottom of which the thermoelectric cooler is fixed, and which is formed by using a material having high heat conductivity, and a sidewall portion which has a thermal expansion coefficient approximately equal to the thermal expansion coefficient of the second holder and in which an opening is made; and an optical fiber unit including:

an optical fiber, and a fourth holder for supporting the optical fiber and fixing the optical fiber to the sidewall portion, wherein the optical fiber unit optically connects with the optical waveguide chip via the lens through the opening.

8. The optical integrated device according to claim 7, wherein the following equations are satisfied:

$$\frac{1}{S1} + \frac{1}{S2} = \frac{1}{f1} \quad (5a)$$

$$S1 = S10 + (\alpha 2 \times Z21 - \alpha 1 \times Z20) \times \Delta T \quad (5b)$$

$$S2 = S20 + (\alpha 3 \times Z24 + \alpha 5 \times Z25 - \alpha 2 \times Z23) \times \Delta T \quad (5c)$$

where f1 is the focal length of the lens, S1 is the distance in the direction of the optical axis between a point A2 that indicates the center of support the third holder gives to the lens and a point B2 that indicates the position of an end of the optical waveguide chip which optically connects with the lens, Z20 is the distance in the direction of the optical axis between the point B2 and a point C2 where the first holder is fixed to the second holder, Z21 is the distance in the direction of the optical axis between the points A2 and C2, Z22 is the distance in the direction of the optical axis between the point C2 and a point D2 where the second holder is fixed onto the bottom portion, Z23 is the distance in the direction of the optical axis between the points A2 and D2, Z24 is the distance in the direction of the optical axis between the point D2 and a point E2 that indicates the position of the sidewall portion where the optical fiber is fixed, Z25 is the distance in the direction of the optical axis between the point E2 and a point F2 that indicates a position where an end of the optical fiber is supported by the fourth holder, S2 is the distance in the direction of the optical axis between the points A2 and F2, $\alpha 1$ is the thermal expansion coefficients of the optical waveguide chip and the first holder, $\alpha 2$, $\alpha 3$, and $\alpha 5$ are the thermal expansion coefficients of the second holder, the bottom portion, and the fourth holder respectively, S10 and S20 are S1 and S2, respectively, at a reference temperature, and $\Delta T$ is the amount of a temperature change from the reference temperature, the value of Z22 being positive when the point C2 is on the side of the point B2 with the point D2 as a reference and being negative when the point C2 is on the opposite side of the point B2 with the point D2 as a reference.

9. The optical integrated device according to claim 7, wherein:
the first holder has concave portions;
the second holder has convex portions;
the first holder has projections at positions indicative of the level of the optical waveguide which the second holder strikes when the second holder is fitted into the first holder;
the second holder is fitted into the first holder by sliding the first holder and the second holder in the direction of level; and
the first holder is fixed to the second holder at local areas on the projections.

10. The optical integrated device according to claim 7, wherein concave portions are formed in an area on the inner bottom of the package where the second holder is to be mounted to narrow an area where the package and the second holder touch.

11. An optical integrated device in which optical parts are contained in a same package, the device comprising:

an optical element unit including:
a photoelectric conversion element for converting electrical signals into optical signals, and
a thermoelectric cooler for controlling the temperature of the photoelectric conversion element,
the photoelectric conversion element being mounted on the thermoelectric cooler via a subcarrier;
a first optical waveguide unit including:
a first optical waveguide chip for modulating the optical signals outputted from the photoelectric conversion element,
a first holder on which the first optical waveguide chip is mounted and which has a thermal expansion coefficient approximately equal to the thermal expansion coefficient of the first optical waveguide chip,
a second holder which supports the first holder by the sides and to which the first holder is fixed at local areas at a level equal to the level of an optical waveguide on the first optical waveguide chip so that the bottom of the first holder will not touch another part and so that the first holder will be kept in a state in which the first holder is floating in the air,
a first lens, and
a third holder which has a thermal expansion coefficient approximately equal to the thermal expansion coefficient of the first holder and by which the first lens is fixed to the first holder so that the first lens will be kept at the level of an optical axis;
a second optical waveguide unit including:
a second optical waveguide chip for modulating optical signals outputted from the first optical waveguide chip,
a fourth holder on which the second optical waveguide chip is mounted and which has a thermal expansion coefficient approximately equal to the thermal expansion coefficient of the second optical waveguide chip, and
a fifth holder which supports the fourth holder by the sides and to which the fourth holder is fixed at local areas at a level equal to the level of an optical waveguide on the second optical waveguide chip so that the bottom of the fourth holder will not touch another part and so that the fourth holder will be kept in a state in which the fourth holder is floating in the air,
the package including:
a bottom portion onto an inner bottom of which the second holder and the fifth holder are fixed at local areas, onto the inner bottom of which the thermoelectric cooler is fixed, and which is formed by using a material having high heat conductivity, and
a sidewall portion which has a thermal expansion coefficient approximately equal to the thermal expansion coefficients of the second holder and the fifth holder and in which an opening is made; and
an optical fiber unit including:
a second lens,
an optical fiber,
a sixth holder for supporting the second lens, and
a seventh holder for supporting the optical fiber and for fixing the optical fiber to the sixth holder,
the second lens being fixed to an outer surface of the sidewall portion via the sixth holder,
wherein the optical fiber unit optically connects with the second optical waveguide chip through the opening.

12. The optical integrated device according to claim 11, wherein the following equations are satisfied:

$$\frac{1}{S1} + \frac{1}{S2} = \frac{1}{f1} \tag{3a}$$

$$S1 = S10 + (\alpha3 \times Z3 + \alpha4 \times Z4 - \alpha1 \times Z1 - \alpha2 \times Z2) \times \Delta T \tag{3b}$$

$$S2 = S20 + (\alpha4 \times Z5 + \alpha5 \times Z6) \times \Delta T \tag{3c}$$

where f1 is the focal length of the second lens, Z1 is the distance in the direction of the optical axis between a point A where the fourth holder is fixed to the fifth holder and a point B that indicates the position of an end of the second optical waveguide chip which optically connects with the second lens, Z2 is the distance in the direction of the optical axis between the point A and a point C where the fifth holder is fixed onto the bottom portion, Z3 is the distance in the direction of the optical axis between the point C and a point D that indicates the position of the sidewall portion where the second lens is fixed, Z4 is the distance in the direction of the optical axis between the point D and a point E that indicates the center of support the sixth holder gives to the second lens, Z5 is the distance in the direction of the optical axis between the point E and a point F where the seventh holder is fixed to the sixth holder, Z6 is the distance in the direction of the optical axis between the point F and a point G that indicates a position where an end of the optical fiber is supported by the seventh holder, S1 is the distance in the direction of the optical axis between the points B and E, S2 is the distance in the direction of the optical axis between the points E and G, $\alpha1$, $\alpha2$, $\alpha3$, $\alpha4$, and $\alpha5$ are the thermal expansion coefficients of the second optical waveguide chip, the fifth holder, the bottom portion, the sixth holder, and the seventh holder respectively, S10 and S20 are S1 and S2, respectively, at a reference temperature, and $\Delta T$ is the amount of a temperature change from the reference temperature, the value of Z2 being positive when the point A is on the side of the point B with the point C as a reference and being negative when the point A is on the opposite side of the point B with the point C as a reference.

13. The optical integrated device according to claim 11, wherein the following equations are satisfied:

$$\frac{1}{S3} + \frac{1}{S4} = \frac{1}{f2} \tag{6a}$$

$$S3 = S30 + \alpha a \times S3 \times \Delta T \tag{6b}$$

$$S4 = S40 + \tag{6c}$$
$$(\alpha3 \times Z43 - \alpha a \times Z41 - \alpha2 \times Z42 - \alpha b \times Z44 - \alpha2 \times Z45) \times \Delta T$$

where f2 is the focal length of the first lens, S3 is the distance in the direction of the optical axis between a point A3 that indicates the center of support the third holder gives to the first lens and a point B3 that indicates the position of an end of the first optical waveguide chip which optically connects with the first lens, Z40 is the distance in the direction of the optical axis between the point B3 and a point C3 where the first holder is fixed to the second holder, Z41 is the distance in the direction of the optical axis between the points A3 and C3, Z42 is the distance in the direction of the optical axis between the point C3 and a point D3 where the second holder is fixed onto the bottom portion of the package, Z44 is the distance in the direction of the optical axis between a point E3 that indicates the position of an end of the second optical waveguide chip which optically connects with the first lens and a point F3 where the fourth holder is fixed to the fifth holder, Z45 is the distance in the direction of the optical axis between the point F3 and a point G3 where the fifth holder is fixed onto the bottom portion of the package, S4 is the distance in the direction of the optical axis between the points A3 and E3, Z43 is the distance in the direction of the optical axis between the points D3 and G3, $\alpha a$ is the thermal expansion coefficients of the first optical waveguide chip and the first holder, $\alpha2$ is the thermal expansion coefficients of the second holder and the fifth holder, $\alpha3$ is the thermal expansion coefficient of the bottom portion of the package, a b is the thermal expansion coefficients of the second optical waveguide chip and the fourth holder, S30 and S40 are S3 and S4, respectively, at a reference temperature, and $\alpha T$ is the amount of a temperature change from the reference temperature, the value of Z42 being positive when the point C3 is on the side of the point B3 with the point D3 as a reference and being negative when the point C3 is on the opposite side of the point B3 with the point D3 as a reference, the value of Z45 being positive when the point F3 is on the side of the point E3 with the point G3 as a reference and being negative when the point F3 is on the opposite side of the point E3 with the point G3 as a reference.

14. The optical integrated device according to claim 11, wherein:
the first holder has concave portions;
the second holder has convex portions;
the first holder has projections at positions indicative of the level of the optical waveguide which the second holder strikes when the second holder is fitted into the first holder;
the second holder is fitted into the first holder by sliding the first holder and the second holder in the direction of level; and
the first holder is fixed to the second holder at local areas on the projections.

15. The optical integrated device according to claim 11, wherein:
the fourth holder has concave portions;
the fifth holder has convex portions;
the fourth holder has projections at positions indicative of the level of the optical waveguide which the fifth holder strikes when the fifth holder is fitted into the fourth holder;
the fifth holder is fitted into the fourth holder by sliding the fourth holder and the fifth holder in the direction of level; and
the fourth holder is fixed to the fifth holder at local areas on the projections.

16. The optical integrated device according to claim 11, wherein concave portions are formed in areas on the inner bottom of the package where the second holder and the fifth holder are to be mounted to narrow an area where the package and the second holder touch and an area where the package and the fifth holder touch.

17. An optical integrated device in which optical parts are contained in a same package, the device comprising:
an optical element unit including:
a photoelectric conversion element for converting electrical signals into optical signals, and a thermoelectric cooler for controlling the temperature of the photoelectric conversion element, the photoelectric conversion element being mounted on the thermoelectric cooler via a subcarrier;

a first optical waveguide unit including:

a first optical waveguide chip for modulating the optical signals outputted from the photoelectric conversion element, a first holder on which the first optical waveguide chip is mounted and which has a thermal expansion coefficient approximately equal to the thermal expansion coefficient of the first optical waveguide chip, a second holder which supports the first holder by the sides and to which the first holder is fixed at local areas at a level equal to the level of an optical waveguide on the first optical waveguide chip so that the bottom of the first holder will not touch another part and so that the first holder will be kept in a state in which the first holder is floating in the air, a first lens, and a third holder which has a thermal expansion coefficient approximately equal to the thermal expansion coefficient of the second holder and by which the first lens is fixed to the second holder so that the first lens will be kept at the level of an optical axis;

a second optical waveguide unit including:

a second optical waveguide chip for modulating optical signals outputted from the first optical waveguide chip, a fourth holder on which the second optical waveguide chip is mounted and which has a thermal expansion coefficient approximately equal to the thermal expansion coefficient of the second optical waveguide chip, and a fifth holder which supports the fourth holder by the sides and to which the fourth holder is fixed at local areas at a level equal to the level of an optical waveguide on the second optical waveguide chip so that the bottom of the fourth holder will not touch another part and so that the fourth holder will be kept in a state in which the fourth holder is floating in the air, the package including:

a bottom portion onto an inner bottom of which the second holder and the fifth holder are fixed at local areas, onto the inner bottom of which the thermoelectric cooler is fixed, and which is formed by using a material having high heat conductivity, and a sidewall portion which has a thermal expansion coefficient approximately equal to the thermal expansion coefficients of the second holder and the fifth holder and in which an opening is made; and an optical fiber unit including:

a second lens, an optical fiber, a sixth holder for supporting the second lens, and a seventh holder for supporting the optical fiber and for fixing the optical fiber to the sixth holder, the second lens being fixed to an outer surface of the sidewall portion via the sixth holder, wherein the optical fiber unit optically connects with the second optical waveguide chip through the opening.

18. The optical integrated device according to claim 17, wherein the following equations are satisfied:

$$\frac{1}{S1} + \frac{1}{S2} = \frac{1}{f1} \tag{3a}$$

$$S1 = S10 + (\alpha 3 \times Z3 + \alpha 4 \times Z4 - \alpha 1 \times Z1 - \alpha 2 \times Z2) \times \Delta T \tag{3b}$$

$$S2 = S20 + (\alpha 4 \times Z5 + \alpha 5 \times Z6) \times \Delta T \tag{3c}$$

where f1 is the focal length of the second lens, Z1 is the distance in the direction of the optical axis between a point A where the fourth holder is fixed to the fifth holder and a point B that indicates the position of an end of the second optical waveguide chip which optically connects with the second lens, Z2 is the distance in the direction of the optical axis between the point A and a point C where the fifth holder is fixed onto the bottom portion, Z3 is the distance in the direction of the optical axis between the point C and a point D that indicates the position of the sidewall portion where the second lens is fixed, Z4 is the distance in the direction of the optical axis between the point D and a point E that indicates the center of support the sixth holder gives to the second lens, Z5 is the distance in the direction of the optical axis between the point E and a point F where the seventh holder is fixed to the sixth holder, Z6 is the distance in the direction of the optical axis between the point F and a point G that indicates a position where an end of the optical fiber is supported by the seventh holder, S1 is the distance in the direction of the optical axis between the points B and E, S2 is the distance in the direction of the optical axis between the points E and G, α1, α2, α3, α4, and α5 are the thermal expansion coefficients of the second optical waveguide chip, the fifth holder, the bottom portion, the sixth holder, and the seventh holder respectively, S10 and S20 are S1 and S2, respectively, at a reference temperature, and ΔT is the amount of a temperature change from the reference temperature, the value of Z2 being positive when the point A is on the side of the point B with the point C as a reference and being negative when the point A is on the opposite side of the point B with the point C as a reference.

19. The optical integrated device according to claim 17, wherein the following equations are satisfied:

$$\frac{1}{S3} + \frac{1}{S4} = \frac{1}{f2} \tag{7a}$$

$$S3 = S30 + (\alpha 2 \times Z51 - \alpha a \times Z50) \times \Delta T \tag{7b}$$

$$S4 = S40 + (\alpha 3 \times Z54 - \alpha 2 \times Z53 - \alpha 2 \times Z56 - \alpha b \times Z55) \times \Delta T \tag{7c}$$

where f2 is the focal length of the first lens, S3 is the distance in the direction of the optical axis between a point A4 that indicates the center of support the third holder gives to the first lens and a point B4 that indicates the position of an end of the first optical waveguide chip which optically connects with the first lens, Z50 is the distance in the direction of the optical axis between the point B4 and a point C4 where the first holder is fixed to the second holder, Z51 is the distance in the direction of the optical axis between the points A4 and C4, $Z_{52}$ is the distance in the direction of the optical axis between the point C4 and a point D4 where the second holder is fixed onto the bottom portion of the package, $Z_{55}$ is the distance in the direction of the optical axis between a point E4 that indicates the position of an end of the second optical waveguide chip which optically connects with the first lens and a point F4 where the fourth holder is fixed to the fifth holder, $Z_{56}$ is the distance in the direction of the optical axis between the point F4 and a point G4 where the fifth holder is fixed onto the bottom portion of the package, S4 is the distance in the direction of the optical axis between the points A4 and E4, $Z_{54}$ is the distance in the direction of the optical axis between the points D4 and G4, $\alpha a$ is the thermal expansion coefficients of the first optical waveguide chip and the first holder, $\alpha 2$ is the thermal expansion coefficients of the second holder and the fifth holder, $\alpha 3$ is the thermal expansion coefficient of the bottom portion of the package, $\alpha b$ is the thermal expansion coefficients of the second optical waveguide chip and the fourth holder, S30 and S40 are S3 and S4, respectively, at a reference temperature, and $\Delta T$ is the amount of a temperature change from the reference temperature, the value of $Z_{52}$ being positive when the point C4 is on the side of the point B4 with the point D4 as a reference and being negative when the point C4 is on the opposite side of the point B4 with the point D4 as a reference, the value of $Z_{56}$ being positive when the point F4 is on the side of the point E4 with the point G4 as a reference and being negative when the point F4 is on the opposite side of the point E4 with the point G4 as a reference.

20. The optical integrated device according to claim 17, wherein:
    the first holder has concave portions;
    the second holder has convex portions;
    the first holder has projections at positions indicative of the level of the optical waveguide which the second holder strikes when the second holder is fitted into the first holder;
    the second holder is fitted into the first holder by sliding the first holder and the second holder in the direction of level; and
    the first holder is fixed to the second holder at local areas on the projections.

21. The optical integrated device according to claim 17, wherein:
    the fourth holder has concave portions;
    the fifth holder has convex portions;
    the fourth holder has projections at positions indicative of the level of the optical waveguide which the fifth holder strikes when the fifth holder is fitted into the fourth holder;
    the fifth holder is fitted into the fourth holder by sliding the fourth holder and the fifth holder in the direction of level; and
    the fourth holder is fixed to the fifth holder at local areas on the projections.

22. The optical integrated device according to claim 17, wherein concave portions are formed in areas on the inner bottom of the package where the second holder and the fifth holder are to be mounted to narrow an area where the package and the second holder touch and an area where the package and the fifth holder touch.

* * * * *

UNITED STATES PATENT AND TRADEMARK OFFICE
CERTIFICATE OF CORRECTION

| | |
|---|---|
| PATENT NO. | : 7,267,492 B2 |
| APPLICATION NO. | : 11/099607 |
| DATED | : September 11, 2007 |
| INVENTOR(S) | : Seiichi Ikeda et al. |

It is certified that error appears in the above-identified patent and that said Letters Patent is hereby corrected as shown below:

Col. 28, line 28, delete "$\Delta L1 = \alpha1 \times a \times \Delta T + a2 \times b \times \Delta T \quad (1)$" and insert --$\Delta L1 = \alpha1 \times a \times \Delta T + \alpha2 \times b \times \Delta T \quad (1)$--

Col. 28, line 30, delete "AL2" and insert --$\Delta L2$--

Col. 34, line 17, delete "a b" and insert --$\alpha b$--, therefor.

Col. 34, line 20, delete "$\alpha T$" and insert --$\Delta T$--, therefor.

Signed and Sealed this

Eleventh Day of March, 2008

JON W. DUDAS
*Director of the United States Patent and Trademark Office*